US012693934B2

(12) United States Patent

Schneider et al.

(10) Patent No.: US 12,693,934 B2

(45) Date of Patent: Jul. 28, 2026

(54) DEDICATED RECOVERY MODULES FOR RESOLVING ISSUES WITH FAULTY APPLICATIONS

(71) Applicant: Google LLC, Mountain View, CA (US)

(72) Inventors: Jakob Schneider, London (GB); Martin David Churchill, London (GB); Lidia Gaymond, London (GB)

(73) Assignee: Google LLC, Mountain View, CA (US)

( * ) Notice: Subject to any disclaimer, the term of this patent is extended or adjusted under 35 U.S.C. 154(b) by 172 days.

(21) Appl. No.: 18/568,509

(22) PCT Filed: Mar. 13, 2023

(86) PCT No.: PCT/US2023/064224

§ 371 (c)(1),
(2) Date: Dec. 8, 2023

(87) PCT Pub. No.: WO2024/191455

PCT Pub. Date: Sep. 19, 2024

(65) Prior Publication Data

US 2025/0086060 A1      Mar. 13, 2025

(51) Int. Cl.
*G06F 11/14* (2026.01)
*G06F 11/3604* (2025.01)

(52) U.S. Cl.
CPC ...... *G06F 11/1415* (2013.01); *G06F 11/3612* (2013.01); *G06F 2201/865* (2013.01)

(58) Field of Classification Search
None
See application file for complete search history.

(56) References Cited

U.S. PATENT DOCUMENTS 6,292,933 B1      9/2001   Bahrs et al.
6,317,143 B1      11/2001   Wugofski
(Continued)

FOREIGN PATENT DOCUMENTS

CN           1836420 A        9/2006
CN        102859532 A        1/2013
(Continued)

OTHER PUBLICATIONS

"12 Applet Development Guide," Oracle Inc., retrieved on Dec. 29, 2015, 13 pp.
(Continued)

*Primary Examiner* — Lewis A Bullock, Jr.
*Assistant Examiner* — Mark A Gooray
(74) *Attorney, Agent, or Firm* — Shumaker & Sieffert, P.A.

(57) ABSTRACT

In general, techniques are described by which to enable dedicated recovery modules for resolving issues with faulty applications. A server computing device comprising a memory and a. processor may perform various aspects of the techniques. The memory may store a faulty application indication identifying a faulty application of a plurality of applications hosted for distribution by the server computing device, where the faulty application has an issue occurring during execution of the faulty application by a user computing device. The processor may generate, based on the faulty application indication, a dedicated recovery module dial extends the faulty application, and output, to the user computing device, the dedicated recovery' module to resolve the issue occurring during execution of the faulty application.

16 Claims, 9 Drawing Sheets

(56) References Cited

U.S. PATENT DOCUMENTS

| | | | |
|---|---|---|---|
| 6,754,896 | B2 | 6/2004 | Mishra et al. |
| 7,155,462 | B1 | 12/2006 | Singh et al. |
| 7,181,686 | B1 | 2/2007 | Bahrs |
| 7,206,844 | B2 | 4/2007 | Gupta et al. |
| 7,698,383 | B2 | 4/2010 | Goring et al. |
| 7,707,574 | B2 | 4/2010 | Goring et al. |
| 8,095,940 | B2 | 1/2012 | Bissett et al. |
| 8,112,749 | B2 | 2/2012 | Jelinek et al. |
| 8,495,625 | B1 | 7/2013 | Sanders |
| 8,782,744 | B1 | 7/2014 | Fuller et al. |
| 8,832,296 | B2 | 9/2014 | Yandek et al. |
| 8,943,150 | B2 | 1/2015 | Massey et al. |
| 9,411,571 | B2 | 8/2016 | Gupta et al. |
| 9,612,815 | B1 | 4/2017 | Jagtap et al. |
| 9,628,583 | B2 | 4/2017 | Fu |
| 9,675,890 | B2 | 6/2017 | Ahiska et al. |
| 9,705,973 | B2 | 7/2017 | Austel et al. |
| 9,772,835 | B1 | 9/2017 | Trautmann et al. |
| 9,773,102 | B2 | 9/2017 | Graham et al. |
| 9,817,648 | B2 | 11/2017 | Kirkpatrick |
| 9,854,047 | B2 | 12/2017 | Elias et al. |
| 9,871,745 | B2 | 1/2018 | Steinder et al. |
| 9,898,397 | B2 | 2/2018 | Arif et al. |
| 10,268,531 | B2 | 4/2019 | Kirkpatrick et al. |
| 10,324,734 | B2 | 6/2019 | Kirkpatrick |
| 10,467,025 | B2 | 11/2019 | Kirkpatrick et al. |
| 2002/0129351 | A1 | 9/2002 | Bedos et al. |
| 2004/0103412 | A1 | 5/2004 | Rao et al. |
| 2004/0107291 | A1 | 6/2004 | Gamo |
| 2005/0049790 | A1 | 3/2005 | Holman et al. |
| 2005/0193139 | A1 | 9/2005 | Vinson et al. |
| 2006/0075381 | A1 | 4/2006 | Laborczfalvi et al. |
| 2009/0133014 | A1 | 5/2009 | Laurila et al. |
| 2009/0265788 | A1 | 10/2009 | Ehrenschwender et al. |
| 2010/0313196 | A1 | 12/2010 | De Atley et al. |
| 2011/0119684 | A1 | 5/2011 | Suggs et al. |
| 2012/0304283 | A1 | 11/2012 | Beam et al. |
| 2013/0019237 | A1 | 1/2013 | Pardehpoosh et al. |
| 2013/0204975 | A1 | 8/2013 | Keith, Jr. |
| 2013/0263139 | A1 | 10/2013 | Schejter et al. |
| 2013/0325967 | A1 | 12/2013 | Parks et al. |
| 2014/0007074 | A1 | 1/2014 | Sporkert et al. |
| 2014/0215451 | A1 | 7/2014 | Nachtigal |
| 2014/0229951 | A1 | 8/2014 | Zhang |
| 2014/0282884 | A1 | 9/2014 | Bao et al. |
| 2014/0289807 | A1 | 9/2014 | Collado et al. |
| 2014/0365336 | A1 | 12/2014 | Hurewitz |
| 2015/0154077 | A1 | 6/2015 | Marra et al. |
| 2015/0193296 | A1* | 7/2015 | Chen .................. G06F 11/0778 714/15 |
| 2015/0242622 | A1 | 8/2015 | Xu et al. |
| 2015/0301824 | A1 | 10/2015 | Patton et al. |
| 2015/0347122 | A1 | 12/2015 | Wang et al. |
| 2016/0173540 | A1 | 6/2016 | Linden et al. |
| 2016/0261716 | A1 | 9/2016 | Khalaf et al. |
| 2017/0206071 | A1 | 7/2017 | Kirkpatrick |
| 2017/0206090 | A1 | 7/2017 | Kirkpatrick |
| 2017/0206123 | A1 | 7/2017 | Kirkpatrick |
| 2017/0208137 | A1 | 7/2017 | Kirkpatrick et al. |
| 2018/0060055 | A1 | 3/2018 | Kirkpatrick |
| 2019/0065174 | A1 | 2/2019 | Hilliar et al. |
| 2021/0067607 | A1* | 3/2021 | Gardner ............... H04L 41/082 |
| 2022/0261306 | A1 | 8/2022 | Chandrasekaran |

FOREIGN PATENT DOCUMENTS

| | | | |
|---|---|---|---|
| CN | 103562926 | A | 2/2014 |
| CN | 109358873 | A | 2/2019 |
| CN | 113254056 | A | 8/2021 |
| JP | 2002358208 | A | 12/2002 |
| JP | 2004529419 | A | 9/2004 |
| JP | 2006259806 | A | 9/2006 |
| JP | 2008090578 | A | 4/2008 |
| KR | 1020070109310 | A | 11/2007 |
| WO | 2011080615 | A1 | 7/2011 |
| WO | 2013101950 | A1 | 7/2013 |
| WO | 2013151894 | A1 | 10/2013 |
| WO | 2014193434 | A1 | 12/2014 |

OTHER PUBLICATIONS

"6. The IoC container," The Spring Framework, retrieved on Jan. 8, 2016, 152 pp.

"About Bundles," Apple Inc., Jun. 30, 2015, 6 pp.

"Accessing and Downloading On-Demand Resources," Apple Inc., Oct. 21, 2015, 7 pp.

"App Container Image," GitHub, Inc., retrieved on Dec. 9, 2015, 7 pp.

"App Container Pods," GitHub Inc., retrieved on Dec. 9, 2015, 5 pp.

"App Container Specification," GitHub Inc., retrieved on Jun. 11, 2015, 2 pp.

"App Thinning (iOS, tvOS, watchOS)," Apple Inc., Oct. 21, 2015, 4 pp.

"Class Loading," Oracle Inc., retrieved on Dec. 29, 2015, from http://docs.oracle.com/javase/jndi/tutorial/beyond/, 4 pp.

"Docker (software)," Wikipedia, retrieved on Dec. 29, 2015, 6 pp.

"Docker Engine," Docker Inc., retrieved on Jan. 25, 2017, 10 pp.

"Is Applet jar downloaded by browser or by JVM?," Stack Overflow, Jun. 25, 2011, 2 pp.

"Microsoft App-V", Wikipedia, the free Encyclopedia, revised on Jan. 29, 2010. 5 pp.

"Modern Application Architecture for the Enterprise | Delivering agility, portability, and control with Docker Containers as a Service (CaaS)," Docker Inc., Jan. 21, 2016, 6 pp.

"Multi Class Java Applet," Stack Overflow, Mar. 14, 2011, 2 pp.

"NSBundleResourceRequest," Apple Inc., Sep. 16, 2015, 2 pp.

"On-Demand Resources Essentials," Apple Inc., Oct. 25, 2015, 6 pp.

Allen et al., "Serialization Sets: A Dynamic Dependence-Based Parallel Execution Model," Principles and Practice of Parallel Programming, vol. 44 Issue 4, Apr. 2009, pp. 85-96.

Buck et al., "An API for Runtime Code Patching," International Journal of High Performance Computing Applications, vol. 14 Issue 4, Nov. 2000, pp. 317-329.

Engberg et al., "Privacy Authentication—Persistent Non-Identification in Ubiquitous Environments," Open Business Innovation, Aug. 18, 2002, 6 pp.

Escoffier et al., "iPOJO: an Extensible Service-Oriented Component Framework," IEEE International Conference on Services Computing, Grenoble University, Jul. 9-13, 2007, 8 pp.

Horstmann et al., "Core JAVA 2 vol. 1—Fundamentals," Sun Microsystems Inc., Dec. 18, 2000, pp. 624.

International Search Report and Written Opinion of International Application No. PCT/US2023/064224 dated Sep. 12, 2023, 9 pp.

Jianhui et al., "Run-Time Data-Flow Analysis," Journal of Computer Science & Technology, vol. 17 Issue 4, Jul. 2002, pp. 442-449.

Karle, "Operating System Containers vs. Application Containers," Rising Stack Engineering, May 19, 2015, 13 pp.

Kinney, "Getting Started with Microsoft Application Virtualization", TechNet Magazine, Nov. 2008, Microsoft, pp. 34-41.

Kircher et al., "Pooling", Corporate Technology, Siemens AG, May 10, 2003. 11 pp.

Kleyman, "Understanding Application Containers and OS-Level Virtualization," Data Center Knowledge, retrieved on Jan. 5, 2015, 3 pp.

McGraw et al., "The Base Java Security Model: The Original Applet Sandbox," Ch. 2 Sec. 7, John Wiley & Sons, Inc., retrieved on Jan. 25, 1997, 7 pp.

Samuel et al., "Survivable Key Compromise in Software Update Systems", Proceedings of the 17th ACM Conference on Computer and Communications, Oct. 4, 2010, pp. 61-72.

Shende, "Enhancing Privacy in Intercloud Interaction," IRF International Conference, Apr. 27, 2014, 185 pp.

Solomon, "App Thinning in IOS 9 & NSBundlerSourceRequest," Mutual Mobile, Nov. 5, 2015, 7 pp.

(56)        References Cited

OTHER PUBLICATIONS

Tarantino, "Prefetching/Preloading and Prerendering content with HTML," Blog: Jack of Spades, Jan. 4, 2015, 6 pp.
Vaughn-Nichols, "What is Docker and why is it so darn popular," ZDNet, Aug. 4, 2014, 10 pp.
Venners, "Security and the Class Loader Architecture," JavaWorld, Aug. 1997, 9 pp.
Yang et al., "Application Streaming: A Mobile Application Distribution Method", School of Information Science and Engineering, Central South University, Dec. 16, 2015. 14 pp.
Response to Communication Pursuant to Rules 161(1) and 162 EPC dated Jan. 8, 2024, from counterpart European Application No. 23715390.3, filed Jul. 4, 2024, 15 pp.
First Examination Report from counterpart Indian Application No. 202447001358 dated May 7, 2026, 9 pp.

\* cited by examiner

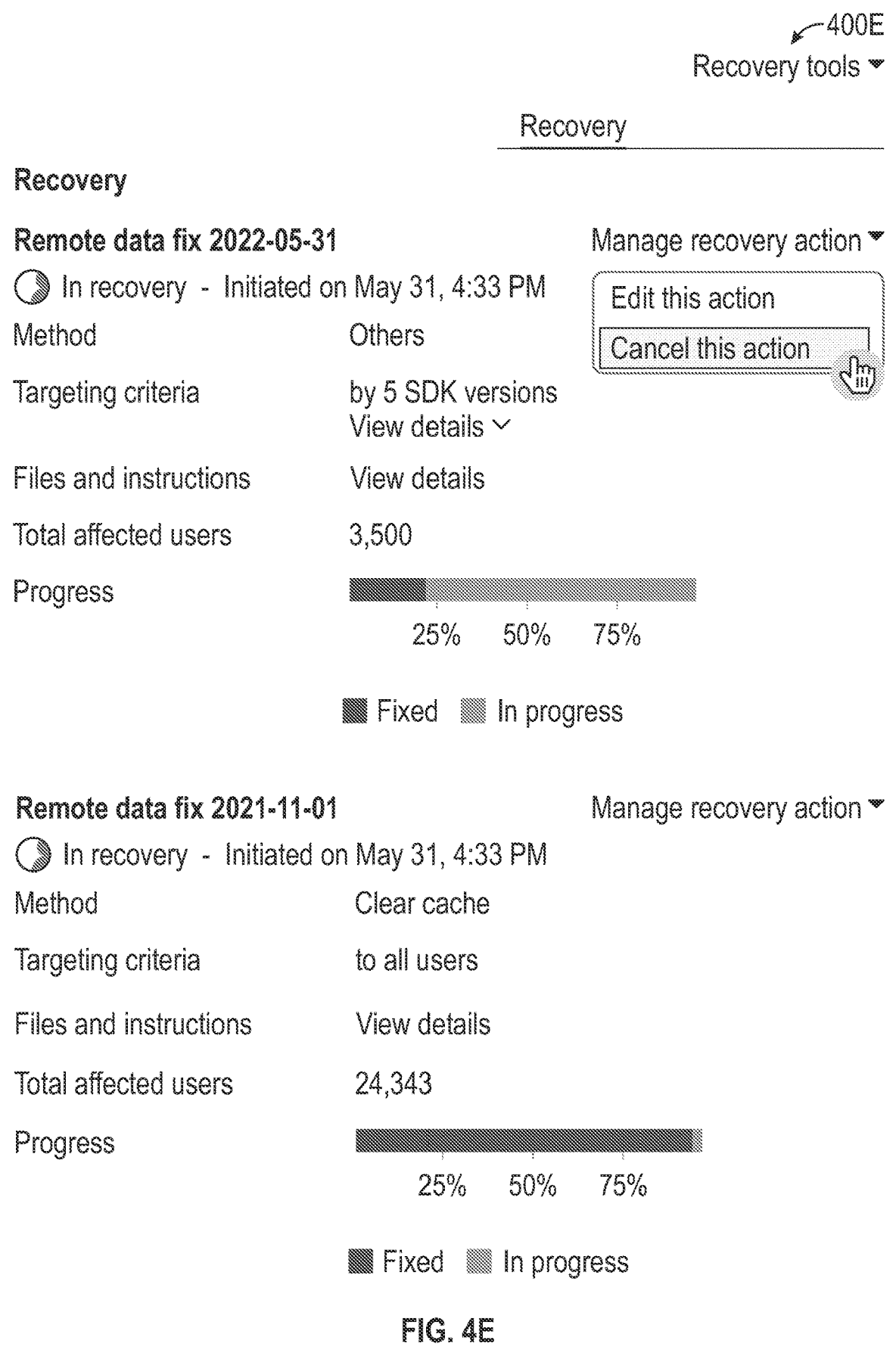

400E

Recovery tools ▾

Recovery

Recovery

Remote data fix 2022-05-31                    Manage recovery action ▾

◑ In recovery - Initiated on May 31, 4:33 PM

|  |  | Edit this action |
|---|---|---|
| Method | Others | Cancel this action |

Targeting criteria            by 5 SDK versions
                              View details ⌄

Files and instructions        View details

Total affected users          3,500

Progress                      [====          ]

25%    50%    75%

■ Fixed  ▨ In progress

Remote data fix 2021-11-01                    Manage recovery action ▾

◑ In recovery - Initiated on May 31, 4:33 PM

Method                        Clear cache

Targeting criteria            to all users

Files and instructions        View details

Total affected users          24,343

Progress                      [===============]

25%    50%    75%

■ Fixed  ▨ In progress

FIG. 4E

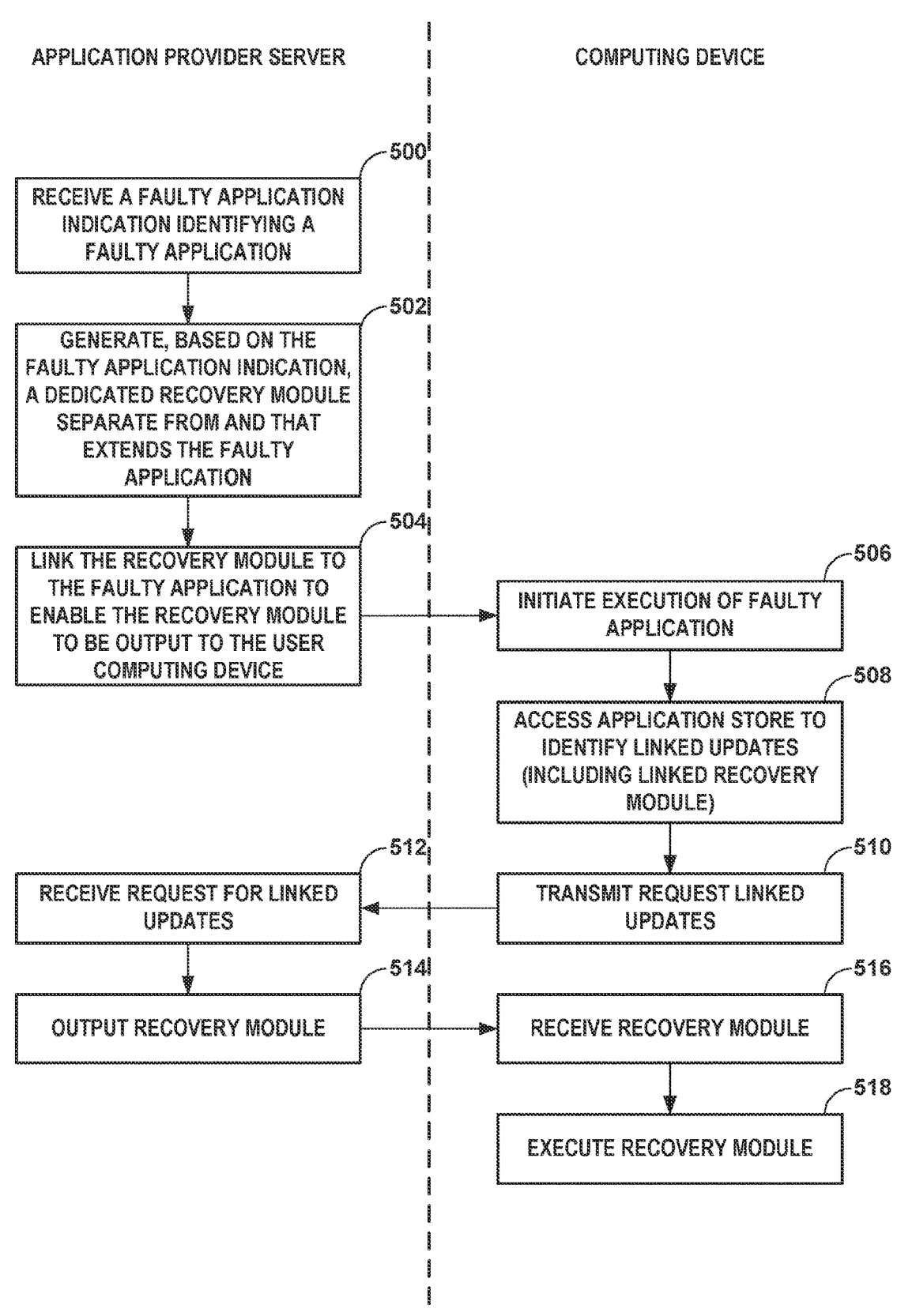

APPLICATION PROVIDER SERVER

COMPUTING DEVICE

RECEIVE A FAULTY APPLICATION INDICATION IDENTIFYING A FAULTY APPLICATION — 500

GENERATE, BASED ON THE FAULTY APPLICATION INDICATION, A DEDICATED RECOVERY MODULE SEPARATE FROM AND THAT EXTENDS THE FAULTY APPLICATION — 502

LINK THE RECOVERY MODULE TO THE FAULTY APPLICATION TO ENABLE THE RECOVERY MODULE TO BE OUTPUT TO THE USER COMPUTING DEVICE — 504

INITIATE EXECUTION OF FAULTY APPLICATION — 506

ACCESS APPLICATION STORE TO IDENTIFY LINKED UPDATES (INCLUDING LINKED RECOVERY MODULE) — 508

RECEIVE REQUEST FOR LINKED UPDATES — 512

TRANSMIT REQUEST LINKED UPDATES — 510

OUTPUT RECOVERY MODULE — 514

RECEIVE RECOVERY MODULE — 516

EXECUTE RECOVERY MODULE — 518

FIG. 5

DEDICATED RECOVERY MODULES FOR RESOLVING ISSUES WITH FAULTY APPLICATIONS

BACKGROUND

Software developers may provide one or more application updates or "patches" to improve the functionality of an application. A patch may include one or more application elements, such as compiled source code (which can be executable code or various abstractions thereof, such as byte code), textures, images, animations, video files, audio files, or any other resource referenced by the executable code. In some distributed environments, a user computing device (e.g., a smartphone) may use an application store application (which may be referred to as an "application store") to obtain and install patches, which are provided by a remote server computing system that supports execution of the application store.

Such patches are often deferred for a number of different reasons. In some instances, the user computing devices executing the applications may have insufficient storage space to accommodate the patch (e.g., due to how patches are applied and may consume significant memory resources during installation). The user computing device may also have limited network access that defers download and application of the patches. In situations in which unpatched applications may be unable to function correctly, such as when the unpatched application "crashes" or "hangs" due to software bugs, or function in violation of various laws and/or regulations (e.g., various copyright issues surrounding use of assets referenced by the executable code), the inability to apply the patch may detract from the user experience or otherwise limit the functionality provided by the user computing device.

SUMMARY

In general, techniques of this disclosure may enable dedicated recovery modules for resolving issues with faulty applications. Rather than deploy a patch that may consume significant computing resources of the user computing device (such as memory, memory bus bandwidth, processing cycles and associated power), the server computing device that hosts distribution of a number of different applications (including a faulty application) may generate a dedicated recovery module that is separate from and extends the faulty application. That is, the dedicated recovery module does not include any program code associated with the underlying faulty application (in comparison to application updates, or in other words, "patches" that reuse at least a portion of the program code from the faulty application) but rather adds functionality to the faulty application that targets the issues occurring during execution of the faulty application. In this sense, the recovery module is targeted at (or in other words dedicated to) resolving the issues of the faulty applications.

The server computing device may deploy this dedicated recovery module to the user computing device, which may execute the dedicated recovery module to resolve the issues occurring during execution of the faulty application. The dedicated recovery module may be linked to execution of the faulty application, which invokes the dedicated recovery module during execution of the faulty application. In some instances, the dedicated recovery module may prompt (e.g., via a user interface) the user to initiate various actions to resolve the issue occurring during execution of the faulty application (where such actions may involve deleting files, clearing caches, modifying data in databases, updating the faulty application to a newer version, etc.)

Accordingly, the described techniques may improve operation of the user computing device as well as a computing system that includes the user computing device and the server. Because the dedicated recovery module only includes program code necessary to resolve the issue (without modifying any underlying code of the faulty application itself in contrast to patches, but only extending the underlying code of the faulty application), the dedicated recovery module may be significantly smaller than the patches (e.g., the dedicated recovery module may be on the order of 100s of kilobytes compared to multiple megabytes or even gigabytes of patches). As a result, the server computing system may more rapidly deploy the dedicated recovery module to resolve the issues in comparison to patches given that limited memory consumption may improve the likelihood of download and execution of the dedicated recovery module in comparison to patches. In this sense, faulty applications may be addressed more quickly and with less overhead (in terms of computing resources consumed) in comparison to patches, which may improve the user experience while potentially facilitating more efficient operation of the user computing device and the server computing device.

In one example, various aspects of the techniques are directed to a method comprising: receiving, by one or more processors of a server computing device hosting distribution of a plurality of applications, a faulty application indication identifying a faulty application of the plurality of applications, the faulty application having an issue that occurs during execution of the faulty application by a user computing device; generating, by one or more processors of the server computing device and based on the faulty application indication, a dedicated recovery module that extends the faulty application; and outputting, by the one or more processors of the server computing device and to the user computing device, the dedicated recovery module to resolve the issue that occurs during execution of the faulty application.

In another example, various aspects of the techniques are directed to a server computing device comprising: a memory configured to store a faulty application indication identifying a faulty application of a plurality of applications hosted for distribution by the server computing device, the faulty application having an issue occurring during execution of the faulty application by a user computing device; and one or more processors configured to: generate, based on the faulty application indication, a dedicated recovery module that extends the faulty application; and output, to the user computing device, the dedicated recovery module to resolve the issue occurring during execution of the faulty application.

In another example, various aspects of the techniques are directed to an apparatus comprising: means for receiving a faulty application indication identifying a faulty application of a plurality of applications, the faulty application having an issue that occurs during execution of the faulty application by a user computing device; means for generating, based on the faulty application indication, a dedicated recovery module that extends the faulty application; and means for outputting, to the user computing device, the dedicated recovery module to resolve the issue that occurs during execution of the faulty application.

In another example, various aspects of the techniques are directed to a non-transitory computer-readable storage medium having instructions stored thereon that, when executed, cause one or more processors of a server computing device to: receive a faulty application indication identifying a faulty application of a plurality of applications hosted for distribution by the server computing device, the faulty application having an issue occurring during execution of the faulty application by a user computing device, generate, based on the faulty application indication, a dedicated recovery module that extends the faulty application; and output, to the user computing device, the dedicated recovery module to resolve the issue occurring during execution of the faulty application.

In another example, various aspects of the techniques are directed to a method comprising: storing, by one or more processors of a user computing device, a faulty application that presents an issue during execution by the one or more processors; receiving, by one or more processors and from a server computing device that hosts distribution of a plurality of applications including the faulty application, a dedicated recovery module that extends the faulty application; and executing, by the one or more processors, the dedicated recovery module to resolve the issue occurring during execution of the faulty application.

In another example, various aspects of the techniques are directed to a user computing device comprising: a memory configured to store a faulty application, the faulty application having an issue occurring during execution of the faulty application by the user computing device; and one or more processors configured to: receive, from a server computing device that hosts distribution of a plurality of applications including the faulty application, a dedicated recovery module that extends the faulty application; and execute, by the one or more processors, the dedicated recovery module to resolve the issue occurring during execution of the faulty application.

In another example, various aspects of the techniques are directed to an apparatus comprising: means for storing a faulty application that presents an issue during execution by one or more processors; means for receiving, from a server computing device that hosts distribution of a plurality of applications including the faulty application, a dedicated recovery module that extends the faulty application; and means for executing the dedicated recovery module to resolve the issue occurring during execution of the faulty application.

In another example, various aspects of the techniques are directed to a non-transitory computer-readable storage medium having instructions stored thereon that, when executed, cause one or more processors of a user computing device to: store a faulty application, the faulty application having an issue occurring during execution of the faulty application by the user computing device; receive, from a server computing device that hosts distribution of a plurality of applications including the faulty application, a dedicated recovery module that extends the faulty application; and execute, by the one or more processors, the dedicated recovery module to resolve the issue occurring during execution of the faulty application.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIGS. 4A-4E are diagrams illustrating example user interfaces for configuring, deploying, and monitoring recovery modules deployed for faulty application recovery in accordance with various aspects of the techniques described in this disclosure.

FIG. 5 is a flowchart illustrating example operation of the application provider server shown in the example in FIG. 1 in generating the recovery module for application at the computing device in accordance with the recovery techniques described in this disclosure.

DETAILED DESCRIPTION

Figure 1:
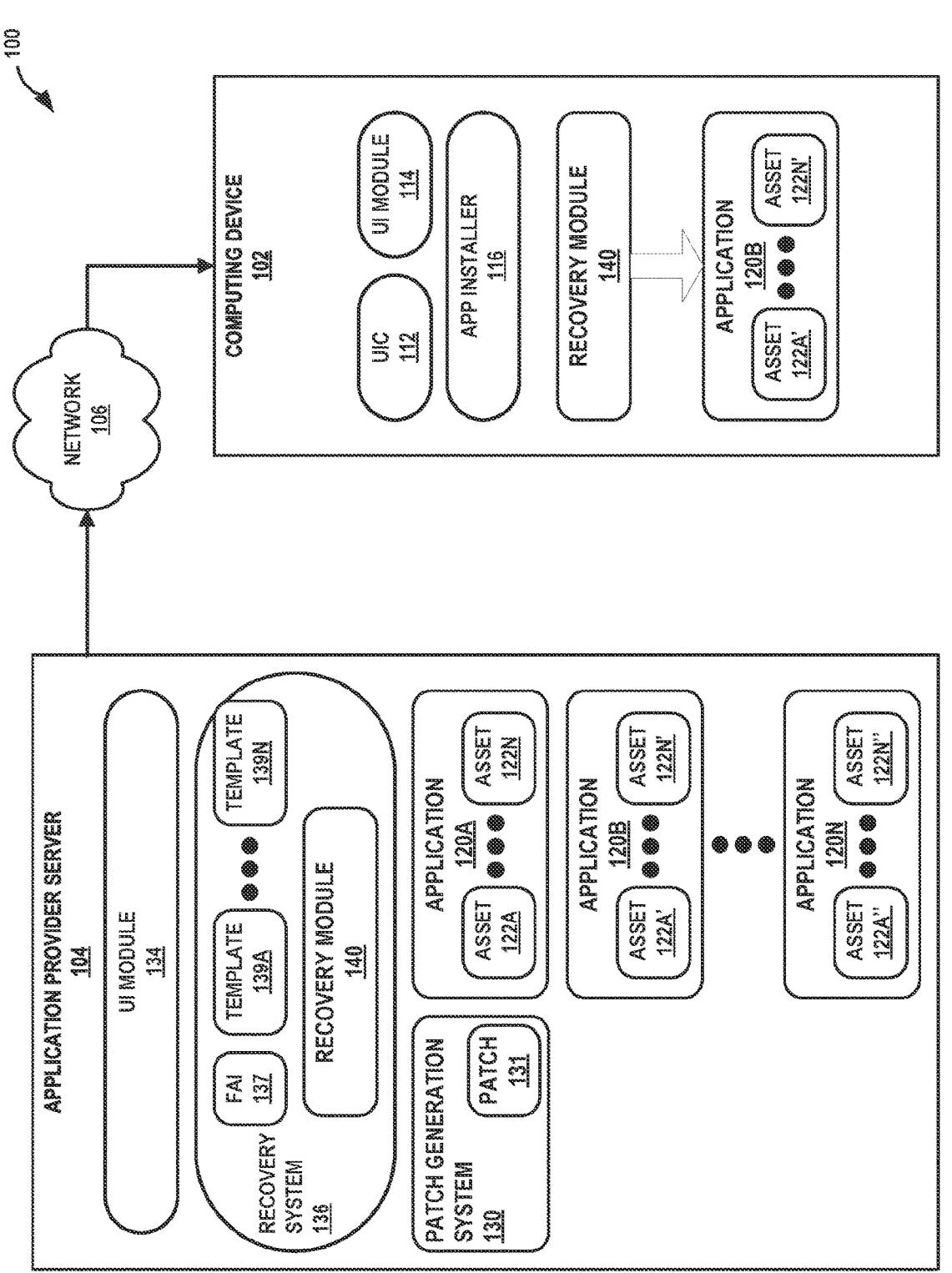
FIG. 1 is a conceptual diagram illustrating an example computing system configured to perform various aspects of the dedicated recovery techniques described in this disclosure.

FIG. 1 is a conceptual diagram illustrating an example computing system in which a computing device may perform various aspects of the dedicated recovery techniques described in this disclosure. As shown in FIG. 1, computing system 100 may include a computing device 102 and an application provider server 104.

Computing device 102 may represent any type of device capable of executing applications, such as application 120B, and supports application of software patches (which may also be referred to as "patches") to such applications. For example, computing device 102 may represent a cellular phone or handset (including a so-called "smart phone"), a streaming media device (including those that are inserted directly into a port of a television), a dedicated gaming system, a portable gaming system, a streaming gaming system, a television (including so-called "smart televisions"), a wireless speaker, a smart hub, a watch (including a so-called "smart watch"), smart glasses, a smart ring or other wearable device, an extended reality device (such as a virtual reality—VR—device, an augmented reality—AR—device, etc.), a digital video disc (DVD) player, a Blu-Ray™ player, a laptop computer, a desktop computer, a workstation, or any other device capable of executing applications.

As shown in the example of FIG. 1, computing device 102 includes a user interface component (UIC) 112, UI module 114, an application installer 116, and application 120B. UIC 112 of computing device 102 may function as an input and/or output device for computing device 102. UIC 112 may be implemented using various technologies. For instance, UIC 112 may function as an input device using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology.

UI module 114 may manage user interactions with UIC 112 and other components of computing device 102. UIC 112 and UI module 114 may receive one or more indications of input (e.g., voice input, gesture input, etc.) from a user as the user interacts with a user interface presented by UIC 112. Application 120B may represent an application that is currently installed on computing device 102. While the example of FIG. 1 illustrates a single application 120B that is currently installed on computing device 102, it should be understood that any number of applications may be installed on computing device 102, and that computing device 102 is not necessarily limited to only having a single application installed on computing device 102.

Application installer 116 may represent a module or unit configured to install application 120B on computing device 102. Application installer 116 may also present an interface provided by application provider server 104 with which the user of computing device 102 may interact via UIC 112 and/or UI module 114 to download application 120B. Application installer 116 may communicate with application provider server 104 to arrange for the download of application 120B, where application installer 116 may, upon receiving application 120B, perform various operations to install application 120B, such as decompressing (which may be referred to as "unzipping") application 120B, memory management, compilation and/or translation, etc.

UIC 112, UI module 114, application installer 116, and application 120B may perform operations described herein using hardware, or a combination of hardware and software and/or firmware residing in and/or executing at computing device 102. Computing device 102 may execute UI module 114, application installer 116, and application 120B with multiple processors or multiple devices. In some cases, computing device 102 may execute UI module 114 and/or application installer 116 as virtual machines executing on underlying hardware. UI module 114 and/or application installer 116 may also execute as one or more services of an operating system or computing platform, or as one or more executable programs at an application layer of a computing platform.

Application 120B may include one or more assets 122A-122N' ("assets 122'"). Assets 122' may refer to resources (e.g., images, textures, files, scripts, video data, audio data, etc.) that are accessed during execution of the application, and the like. It should be understood that assets 122' of application 120B may not be accessible by other applications installed on computing device 102 without explicit permission of application 120B. Thus, assets 122' may not include shared libraries or other data that is accessed by multiple different applications. Likewise, application 120B may not be able to access assets of a different application. In some examples, computing device 102 may execute application 120B in a sandboxed environment, which isolates assets 122' of application 120B from other applications. For example, computing device 102 may execute application 120B as virtual machines or as separate processes within virtual machines, as programs at the application layer of the computing platform.

In some examples, application 120B represents a first party application designed and deployed along with an underlying operating system or a third-party application designed and deployed by a developer for execution in an application space of the underlying operating system. That is, an operating system executed by computing device 102 may include a kernel, which represents a software process integral to the operating system that executes in kernel space. Kernel space grants increased levels of privilege to the kernel (relative to the application space) such that the kernel can negotiate access to underlying hardware of computing device 102.

The kernel may perform hypervisor functions to schedule execution of processes according to various priorities and otherwise expose application programming interfaces (APIs) by which applications, such as application 120B, executing in the application space may interact with the underlying hardware. Via these APIs, the kernel presents the application space, which may, as noted above, be partitioned for each application executing within the application space.

The application space has limited levels of privilege (compared to the kernel space) with respect to accessing the underlying hardware. The kernel enforces these limited privilege levels via the API and other mechanisms. The kernel may partition the application space to grant individual levels of privilege to each application executing within the application space, including granting higher or lower priorities for access to the underlying hardware.

In this sense, the broader operating system, including the kernel (or, in other words, core of the operating system) should not be understood to be the same as or functionally equivalent to either first party applications or third-party applications, although some first party applications may receive higher levels of privileges compared to third party applications. The operating system (OS), while software in a similar manner to applications, including application 120B, is a dedicated lower software layer in the software stack (referred to herein as the "OS layer") that supports execution of applications at a higher layer in the software stack (referred to herein as the "application layer").

As further shown in the example of FIG. 1, computing device 102 may communicate with application provider server 104 via a network 106, where network 106 may represent any public or private communications network, for instance, cellular, Wi-Fi, and/or other types of networks, for transmitting data between computing systems, servers, and computing devices. Network 106 may include one or more network hubs, network switches, network routers, or any other network equipment, that are operatively inter-coupled thereby providing for the exchange of information (often referred to as "data packets" or "packets") between application provider server 104 and computing device 102.

Computing device 102 and application provider server 104 may transmit and receive data across network 106 using any suitable communication techniques. Computing device 102 and application provider server 104 may each be operatively coupled to network 106 using respective network links. The links coupling computing device 102 and application provider server 104 to network 106 may be Ethernet or other types of network connections and such connections may be wireless and/or wired connections.

Application provider server 104 may represent any suitable remote computing system, such as one or more desktop computers, laptop computers, mainframes, servers, cloud computing systems, etc. capable of sending and receiving information both to and from a network, such as network 106. Application provider server 104 hosts (or at least provides access to) applications and presents the above noted interface (such as an application store, which is not shown in the example of FIG. 1 for ease of illustration purposes) by which computing device 102 may access applications for download to computing device 102 via network 106. Application provider server 104 may, in this respect, represent a server computing device configured to host distribution of a number of different (or, in other words, a plurality of) applications, including application 120B.

In the example of FIG. 1, application provider server 104 may host a number of different versions for the same application 120A-120N (including application 120B, which may collectively be referred to as "application 120"). Application provider server 104 may host different versions of application 120 for a variety of reasons.

For example, application provider server 104 may host different versions of application 120 for different display sizes of various types of computing devices, different display resolutions of various types of computing devices, different geographical locations in which computing devices reside, different languages of users of computing devices, etc. As another example, application provider server 104 may host different versions of application 120 to support different versions of the underlying operating system executed by the computing devices, different processors (including graphical processing units) by which the computing devices execute application 120, etc. As a further example, developers may create different versions of application 120 for experimental purposes in order to test new features (e.g., so-called beta testing).

Different versions of application 120 may include different assets 122 (or possibly updated assets 122). The different assets 122 for each version of application 120 are denoted by the prime notation, where the example of FIG. 1 denotes assets 122A-122N ("assets 122") of application 120A without any prime notation, assets 122A'-122N' ("assets 122'") of application 120B with a single prime notation, and assets 122A"-122N" ("assets 122''") of application 120N with a double prime notation.

While all of assets 122A'-122N' include the prime notation, it should be understood that only a single asset, multiple but not all, or possibly all of the assets, may be the same as assets 122 and/or assets 122". In other words, the prime notation should be understood to denote the respective assets of the versions of application 120 rather than strictly used to denote that assets 122' are all changed relative to assets 122 and/or assets 122". Similarly, assets 122" may include one or more (and possibly all) unchanged assets relative to assets 122 and/or assets 122'. For purposes of illustration, it is assumed that at least one asset 122 has changed relative to assets 122' and/or assets 122", at least one asset 122" has changed relative to assets 122 and/or assets 122", and at least one asset 122" has changed relative to assets 122 and/or assets 122'.

Application provider server 104 may perform operations described using hardware or a mixture of hardware, software, and firmware residing in and/or executing at application provider server 104. Application provider server 104 may perform various operations described herein with multiple processors or multiple devices. Application provider server 104 may also execute various modules or units described in more detail below as virtual machines executing on underlying hardware. In some examples, application provider server 104 may execute the interface by which to access an application as one or more services of an operating system or computing platform, or as one or more executable programs at an application layer of a computing platform.

Application provider server 104 may include a patch generation system 130, which may generate a patch 131 for application 120. Patch generation system 130 may execute various patching algorithms to generate patch 131, such as generic difference (diff) ("Gdiff"), bsdiff, and the like, which may generate and potentially compress (along with other operations performed with respect to) the underlying binary differences between different versions of application 120 to form patch 131.

That is, each version of application 120 may represent compiled source code (or, in other words, executable binary code or some derivation thereof, such as byte code) that configures or otherwise programs a processor (or other hardware) to perform various operations. Patch generation system 130 may represent a unit configured to determine a difference between different versions of application 120, and output a list of commands for updating a first version of application 120 (e.g., application 120A) to a second version of application 120 (e.g., application 120B) and a difference that both form patch 131. Commands may identify one or more delete operations, one or more copy operations, and/or one or more of write operations (or any combinations thereof) instructing computing device 102 how to manipulate the first version of application 120 to produce the second version of application 120.

Upon generating patch 131, application provider server 104 may interface with app installer 116 executed by computing device 102 to indicate that patch 131 is available for download. App installer 116 may, in some instances, produce, responsive to the indication that patch 131 is available, an alert or other indication that patch 131 for the installed version of application 120 (which, while not shown in the example of FIG. 1, assumed to be application 120A) is available for download and installation. The user of computing device 102 may, in this instance, interface with app installer 116 via UIC 112 and/or UI module 114 to initiate download and install of patch 131. In other instances, app installer 116 may automatically download and install patch 131 responsive to the indication that patch 131 is available. The user may specify that automatic patching is enabled in system settings or per application, identifying a time and/or day during which automated patching may occur.

Regardless, computing device 102 may obtain patch 131 from application provider server 104 and install patch 131 to application 120A to produce a second version of application 120 (e.g., application 120B). Patching in this manner may occur to allow developers of application 120 to add additional functionality, fix software errors (so-called "software bugs"), prevent malicious attacks, update graphical capabilities or other functionality, and the like without having to download an entirely new application (which can be large and therefore consume significant bandwidth—both bandwidth of network 106 and memory and/or storage bandwidth of computing device 102, processor cycles of computing device 102, etc.).

While patching may generally improve operation of application 120 and thereby improve operation of computing device 102, patch 131 may still, in certain instances, be large (on the order of multiple gigabytes—e.g., several to tens of gigabytes, multiple megabytes—e.g., hundreds of megabytes, etc.). For example, developers may update assets 122 of application 120A to improve graphical fidelity, update textures, add or remove video data and/or audio data, or perform other example updates that improve a user experience of application 120A (which may also be referred to as "unpatched application 120A").

As such, application 120B (which may be referred to as "patched application 120B") may include a different set of assets 122' in which one or more of assets 122' may differ with assets 122 (although one or more of assets 122' may, in some instances and as noted above, be the same as assets 122). In this example, patch generation system 130 may not determine there is much if any difference between the compiled source code of unpatched application 120A and patched application 120B, but only note that there are differences between assets 122 and assets 122', resulting in a diff that mainly includes assets 122' that include assets that replace or that are in addition to assets of assets 122.

In some instances, due to the patching process, computing device 102 may have insufficient storage space (e.g., memory and/or storage space) to store unpatched application 120A, patched application 120B, and patch 131. In other words, to apply patch 131, computing device 102 may download patch 131 in its entirety and reserve available space in memory and/or storage for patched application 120B, all while storing unpatched application 120A in its entirety. Computing device 102 may then iterate through commands of patch 131, perform one or more of the above operations to construct patched application 120B from unpatched application 120A and diff of patch 131. While various aspects of the techniques are described with respect to assets, the techniques may be implemented with respect to compiled source code or other types of files, resources, and/or data not described in detail in this disclosure.

To illustrate how memory and/or storage limited computing devices may be impacted by this process, assume computing device 102 only has 1.4 gigabytes (GB) of memory available and is to install patch 117 that is of a size of 400 megabytes (MB) with respect to unpatched application 120A that is of a size of 1 GB resulting in patched application 120B of a size of 1.2 GB. In this example illustration, computing device 102 may download patch 117 consuming 400 MB of the 1.4 GB of available memory resulting in only 1 GB of available memory. When computing device 102 attempts to reserve the 1.2 GB of memory for patched application 120B, a memory manager of computing device 102 (which is not shown for ease of illustration purposes) may deny the request due to insufficient available memory (as 1.2 GB is larger than the 1 GB of available memory). As such, computing device 102 may not apply patch 117 to unpatched application 120A.

The inability to apply patch 131 may result in computing device 102 being unable to execute patched application 120B, and thereby potentially deprive the user of added functionality, updated graphics, audio experiences, video experiences, etc., expose computing device 102 to security vulnerabilities, and the like. As computing devices, such as computing device 102, continue to evolve, such computing devices are being employed for increasingly larger amounts of time such that shortages of available memory can often become a barrier to proper patch application (such as in the case of smart phones that store large amounts of personal information in the form of videos, text-including text messages, emails, etc., images—such as photos, and the like).

As such, patches are often deferred due to limited memory but also for a number of different reasons. User computing device 102 may also have limited network access that defers download and application of the patches. In situations in which unpatched applications may be unable to function correctly, such as when the unpatched application "crashes" or "hangs" due to software bugs, or function in violation of various laws and/or regulations (e.g., various copyright issues surrounding use of assets referenced by the executable code), the inability to apply the patch may detract from the user experience or otherwise limit the functionality provided by user computing device 102.

In accordance with various aspects of the techniques set forth in this disclosure, application provider server 104 may generate a dedicated recovery module 140 ("recovery module 140") that extends a faulty application (such as application 120B) rather than deploy a patch 131 that may consume significant computing resources of user computing device 102 (such as memory, memory bus bandwidth, processing cycles and associated power). That is, dedicated recovery module 140 does not modify any program code associated with underlying faulty application 120B (in comparison to application updates, or in other words. "patches" that typically modify at least a portion of the existing program code from the faulty application) but rather adds functionality to (or in other words, extends functionality of) faulty application 120B that targets the issues occurring during execution of faulty application 120B. In this sense, recover module 140 targeted at (or in other words dedicated to) resolving the issues of faulty applications 120B.

Application provider server 104 may deploy dedicated recovery module 140 to user computing device 102 (via application installer 116), which may execute dedicated recovery module 140 to resolve the issues occurring during execution of faulty application 120B. Dedicated recovery module 140 may be linked to execution of faulty application 120B (as described in more detail below), which invokes dedicated recovery module 140 during execution of faulty application 120B. In some instances, dedicated recovery module 140 may prompt (e.g., via a user interface) a user to initiate various actions to resolve the issue occurring during execution of faulty application 120B (where such actions may involve deleting files, clearing caches, modifying data in databases, updating faulty application 120 to a newer version of application—e.g., application 120N, etc.).

In operation, application provider server 104 may obtain a faulty application indication (FAI) 137 ("FAI 137") identifying faulty application 120B hosted for distribution by application provider server 104. As noted above, faulty application 120B may have an issue occurring during execution of faulty application 120B by user computing device 102.

As shown in the example of FIG. 1, application provider server 104 may include a UI module 134 and a recovery system 136. UI module 134 may be similar to, and possibly the same as, UI module 114 in terms of operation to present a user interface, such as a graphical user interface. A developer of application 120 may interface with UI module 134 (typically via a remote computing system via a web browser or other application) to initiate a recovery process. Upon initiating a recovery process via UI module 134, application provider server 104 may invoke recovery system 136.

Recovery system 136 may represent a system configured to generate recovery module 140 via interactions with the developer of application 120 by way of UI module 134. Recovery system 136 may interface with UI module 134 to present various user interfaces with which the developer of application 120 may interact to specify FAI 137. The developer may specify FAI 137 by identifying a particular application (e.g., by name) and version (e.g., by number), which effectively selects one or more versions of application 120. FAI 137 may enable recovery module 140 to target one or more versions of application 120 that are faulty, where it is assumed for purposes of example that application 120B is the faulty application (and hence may be referred to as "faulty application 120B").

A faulty application may refer to an application that is faulty in any number of different ways. For example, a faulty application may fail to execute in a manner that enables interaction with the faulty application, where the faulty application may "crash" or "hang." As another example, a faulty application may include assets that violate copyright or other legal requirements/laws. A faulty application may refer to an application that violates safety requirements (e.g., allows excessive interactions while driving). A faulty application may refer to an application that is glitchy or otherwise unstable due to a variety of factors that may be addressed through extension of the functionality of the faulty application. As such, a faulty application should not be limited to only one type of fault, such as crashing or hanging, but may refer to any fault that can be addressed through the addition of extended functionality (but not through alteration of the underlying program code of faulty application).

Recovery system 136 may further interface with the developer via user interfaces presented by UI module 134 to identify a type of the issue occurring during execution of faulty application 120B. In this respect. FAI 137 may include an issue indication that identifies the issue experienced during execution of faulty application 120B by user computing device 102. Recovery system 136 may next select, based on the issue indication, one of template code 139A-139N ("template code 139" or "templates 139") that targets the issue occurring during execution of faulty application 120B by user computing device 102. Recovery system 136 may next populate, based on the issue indication, the selected one of templates 139 to obtain populated template code configured to resolve the issue occurring during execution of faulty application 120B by user computing device 102.

Recovery system 136 may interface with UI module 134 to present, via the user interface, the populated template code. The developer may interface with the user interface to confirm or reject populated template code (or, in some instances, make changes to the populated template code). Assuming the developer approves of the populated template code, recovery system 136 may compile the populated template code to obtain recovery module 140. Recovery module 140 may extend faulty application 120B through an enhancement, which is linked to faulty application 120B through various mechanisms.

To illustrate, consider that various operating systems allow applications to be dynamically extended during execution of applications, where an initial install of the application may include only a portion of the compiled code (which may occur for games and other applications in which an opening portion of the game or other application is executable prior to downloading and installing the entirety of the game). To link recovery module 140 to faulty application 120B, recovery system 136 may update a manifest file associated with faulty application 120B to add recovery module 140 as a sub-package.

Each version of application 120 may represent an application container in which the manifest file defines a list of sub-packages that are either required or optional. The manifest file may define which of the sub-packages are required for the execution of each corresponding version of application 120. The application container may be separately signed to verify the authenticity of each corresponding version of application 120, which is verified upon execution of each version of application 120 to ensure that the version of application 120 is valid.

When recovery system 136 updates the manifest file associated with faulty application 120B to add recovery module 140, the updated version of faulty application 120B is signed and thereby receives a new signature because the contents of application 120B have changed to include recovery module 140. This new signature invalidates previous versions of faulty application 120B that may be installed at computing devices, such as computing device 102, whereupon such computing devices may retrieve the updated manifest file. The updated manifest file may indicate that recovery module 140 is a required sub-package that is to be executed first before any other sub-package associated with faulty application 120B by way of the updated manifest file. In this respect, recovery system 136 may generate, based on faulty application indication 137, a dedicated recovery module 140 that extends faulty application 120B.

User computing device 102 may, at some point after recovery module 140 is linked to application 120B, attempt to execute faulty application 120B. Upon initiating the execution of faulty application 120B, app installer 116 may verify the authenticity of faulty application 120B. As noted above, app installer 116 may verify the signature against the signature of faulty application 120B at application provider server 104 and determine that the signatures do not match. App installer 116 may then determine that an update has occurred with respect to application 120B and interface with application provider server 104 to download the update to application 120B, which in this instance includes an updated manifest file linking recovery module 140 to application 120B.

App installer 116 may update application 120B (which in this instance may include replacing the existing manifest file with the updated manifest file) and verify the authenticity of application 120B with the updated manifest file in the manner described above. In this instance, app installer 116 determines that the signatures of updated application 120B having the updated manifest file and the signature of application 120B at application provider server 104 match, whereupon computing device 102 may execute application 120B. Application 120B, upon initiation of execution, may determine that recovery module 140 has been linked to application 120B and is to be executed first before any other sub-packages associated with the application container represented by application 120B.

Responsive to determining that recovery module 140 has been linked to faulty application 120B, application 120B may interface with app installer 116 to retrieve (or, in this example, download via network 106) recovery module 140. As such, application provider server 104 may output, to user computing device 102, recovery module 140, and user computing device 102 may receive, from application provider server 104, recovery module 140.

User computing device 102 may next execute recovery module 140 to resolve the issue occurring during execution of faulty application 120B by user computing device 102. Recovery module 140 may resolve the issue in a number of different ways depending on the issue identified by issue identification. Recovery module 140 may, for example, delete or edit a file installed by faulty application 120B, such as one of assets 122". Recovery module 140 may, in some instances, delete or edit a cache associated with faulty application 120B (which may be stored to the partition for faulty application 120B in the application space discussed above). Recovery module 140 may, as yet a further example, edit or delete a database associated with faulty application 120B.

As noted above, application 120B may be installed as an experimental version of application 120 to test various new functionality (e.g., a beta test). Recovery module 140 may, in these instances, delete or edit an experimental parameter associated with faulty application 120B. In some examples, recovery module 140 may prompt the user to update faulty application 120B to a newer version, such as application 120N. As noted above, updates may require significantly more resources than recovery module 140, and app installer 116 may confirm that user computing device 102 includes sufficient resources (e.g., network connectivity, memory and/or storage space, etc.) prior to updating faulty application 120B.

Accordingly, the described techniques may improve operation of user computing device 102 as well as computing system 100 that includes user computing device 102 and application provider server 104. Because dedicated recovery module 140 only includes program code necessary to resolve the issue (without including modifying any underlying code of the faulty application itself in contrast to most patches), dedicated recovery module 140 may be significantly smaller than the patches (e.g., dedicated recovery module 140 may be on the order of 100s of kilobytes compared to multiple megabytes or even gigabytes of patches).

As a result, application provider server 104 of computing system 100 may more rapidly deploy dedicated recovery module 140 to resolve the issues in comparison to patches, such as patch 131, given that limited memory consumption may improve the likelihood of download and execution of dedicated recovery module 140 in comparison to patches. In this sense, faulty application 120B may be addressed more quickly and with less overhead (in terms of computing resources consumed) in comparison to patches, which may improve the user experience while potentially facilitating more efficient operation of user computing device 102 and application provider server 104.

Figure 2:
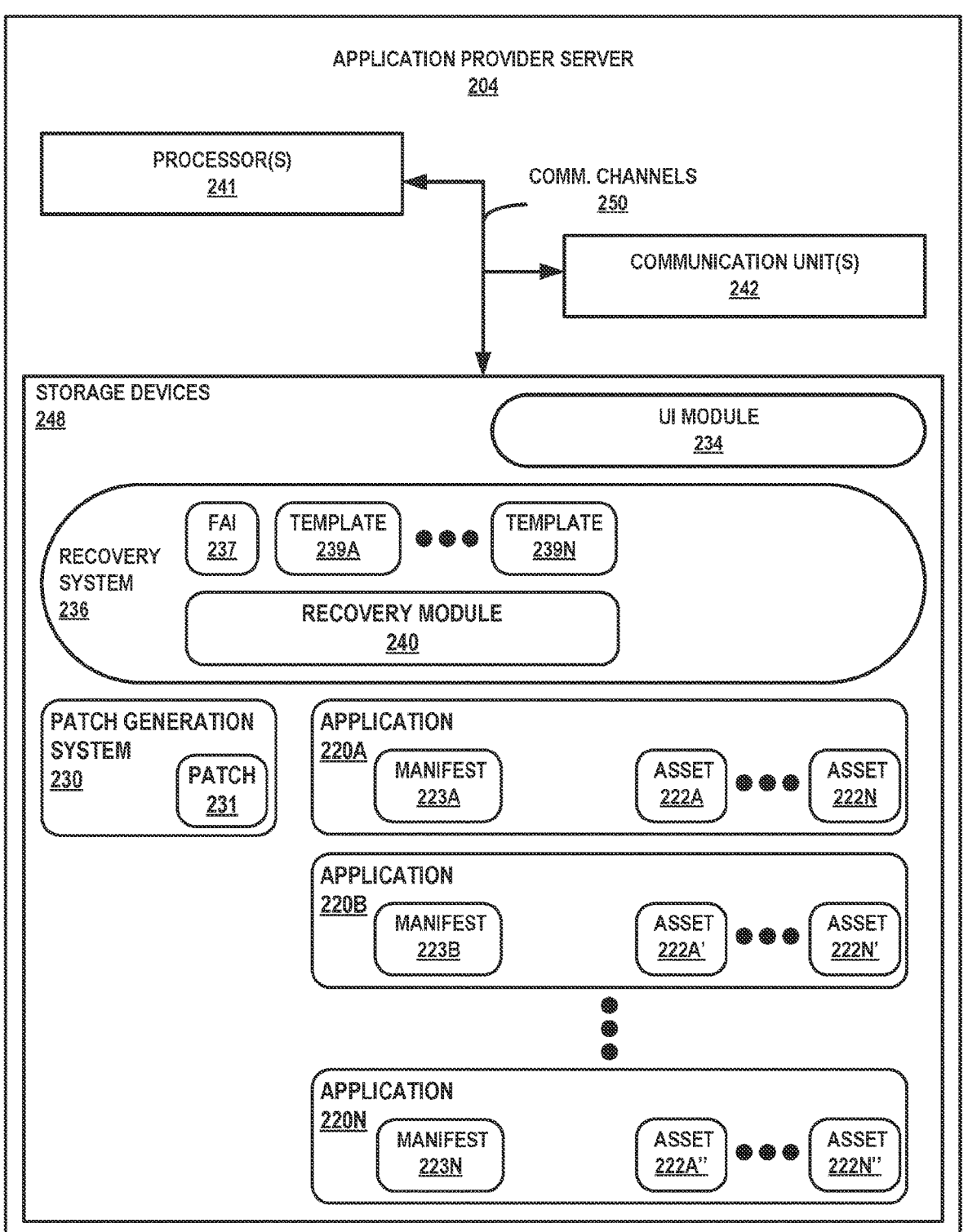
FIG. 2 is a block diagram illustrating an example application provider server configured to perform various aspects of the dedicated recovery techniques described in this disclosure.

FIG. 2 is a block diagram illustrating an example application provider server configured to perform various aspects of the dedicated recovery techniques described in this disclosure. FIG. 2 illustrates only one particular example of application provider server 204, and many other examples of application provider server 204 may be used in other instances. In other examples, application provider servers may include a subset of the components included in example application provider server 204 or may include additional components not shown in FIG. 2. For example, application provider server 204 may comprise a cluster of servers, and each of the servers comprising the cluster of servers making up application provider server 204 may include all, or some, of the components described herein in FIG. 2, to perform the techniques disclosed herein. As such, application provider server 204 represents one example of application provider server 104.

As shown in the example of FIG. 2, application provider server 204 includes one or more processors 241, one or more communication units 242, and one or more storage devices 248. Processors 241 may implement functionality and/or execute instructions associated with application provider server 204. Examples of processors 241 include application processors, display controllers, auxiliary processors, one or more sensor bubs, and any other hardware configured to function as a processor, a processing unit, or a processing device.

Communication unit 242 may represent a unit configured to communicate with external devices (e.g. computing device 102) via one or more wired and/or wireless networks (e.g., network 106) by transmitting and/or receiving network signals via the one or more networks. Examples of communication units 242 include a network interface card (e.g. such as an Ethernet card), an optical transceiver, a radio frequency transceiver, a global positioning satellite (GPS) receiver, a cellular transceiver, or any other type of device that can send and/or receive data. Other examples of communication units 242 may include short wave radios, cellular data radios, wireless network radios, as well as universal serial bus (USB) controllers.

Storage devices 248 may represent one or more memories and/or storage devices configured to store information for processing during operation of application provider server 204. In some examples, storage devices 248 may represent a temporary memory, meaning that a primary purpose of storage devices 248 is not long-term storage. Storage devices 248 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage devices 248 may, in some examples, also include one or more computer-readable storage mediums. Storage devices 248 may include one or more non-transitory computer-readable storage mediums. Storage devices 248 may be configured to store larger amounts of information than typically stored by volatile memory. Storage devices 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories.

Storage devices 248 may store program instructions and/or information (e.g., data) associated with a patch generation system 230, a user interface module 234 ("UI module 234"), a recovery system 236, and applications 220A-220N ("application 220"). Storage devices 248 may include a memory configured to store data or other information associated with patch generation system 230, UI module 234, recovery system 236, and applications 220A-220N.

Application provider server 204 may obtain a faulty application indication (FAI) 137 ("FAI 137") identifying faulty application 120B hosted for distribution by application provider server 204. As noted above, faulty application 220B may have an issue occurring during execution of faulty application 220B by a user computing device, such as user computing device 102.

As shown in the example of FIG. 2, application provider server 204 may include a UI module 234 and a recovery system 236. UI module 234 may be similar to, and possibly the same as, UI module 234 in terms of operation to present a user interface, such as a graphical user interface. A developer of application 220 may interface with UI module 234 (typically via a remote computing system via a web browser or other application) to initiate a recovery process. Upon initiating a recovery process via UI module 234, processors 241 may invoke recovery system 236, which may be similar to (and possibly the same as) recovery system 136.

Recovery system 236 may represent a system configured to generate recovery module 240 via interactions with the developer of application 220 by way of UI module 234. Recovery system 236 may interface with UI module 234 to present various user interfaces with which the developer of application 220 may interact to specify FAI 237. The developer may specify FAI 237 by identifying a particular application (e.g., by name) and version (e.g., by number), which effectively selects one or more versions of application 220. FAI 237 may enable recovery module 240 to target one or more versions of application 220 that are faulty, where it is assumed for purposes of example that application 220B is the faulty application (and hence may be referred to as "faulty application 220B").

Recovery system 236 may further interface with the developer via one or more user interfaces presented by UI module 234 to identify a type of the issue occurring during execution of faulty application 220B. In this respect, FAI 237 may include an issue indication that identifies the issue experienced during execution of faulty application 220B by the user computing device. Recovery system 236 may next select, based on the issue indication, one of template code 239A-239N ("template code 239" or "templates 239") that targets the issue occurring during execution of faulty application 220B by the user computing device. Recovery system 236 may next populate, based on the issue indication, the selected one of templates 239 to obtain populated template code configured to resolve the issue occurring during execution of faulty application 220B by the user computing device.

Recovery system 236 may interface with UI module 234 to present, via the user interface, the populated template code. The developer may interface with the user interface to confirm or reject populated template code (or, in some instances, make changes to the populated template code). Assuming the developer approves of the populated template code, recovery system 236 may compile the populated template code to obtain recovery module 240, where recovery module 240 may represent an example of recovery module 140. Recovery module 240 may extend faulty application 220B through an enhancement, which is linked to faulty application 220B through various mechanisms.

To illustrate, consider that various operating systems allow applications to be dynamically extended during execution of applications, where an initial install of the application may include only a portion of the compiled code (which may occur for games and other applications in which an opening portion of the game or other application is executable prior to downloading and installing the entirety of the game). To link recovery module 240 to faulty application 220B, recovery system 236 may update a manifest file 223B associated with faulty application 220B to add recovery module 140 as a sub-package.

Each version of application 220 may represent an application container in which a corresponding manifest file 223A-223N ("manifests 223") defines a list of sub-packages that are either required or optional. Each manifest 223 may define which of the sub-packages are required for the execution of each corresponding version of application 220. The application container may be separately signed to verify the authenticity of each corresponding version of application 220, which is verified upon execution of each version of application 220 to ensure that the version of application 220 is valid.

When recovery system 236 updates manifest 223B associated with faulty application 220B to add recovery module 240, the updated version of faulty application 220B is signed and thereby receives a new signature because the contents of application 220B have changed to include recovery module 240. This new signature invalidates previous versions of faulty application 220B that may be installed at computing devices, such as computing device 102 (FIG. 1), whereupon such computing devices may retrieve the updated manifest file, which in this instance is assumed to be manifest 223B. Updated manifest file 223B may indicate that recovery module 240 is a required sub-package that is to be executed first before any other sub-package associated with faulty application 120B by way of updated manifest file 223B. In this respect, recovery system 236 may generate, based on faulty application indication 237, a dedicated recovery module 240 that extends faulty application 220B (meaning, in other words, extends the functionality of faulty application 220B).

Recovery system 236 may at some later point output, to the user computing device, recovery module 240 to resolve the issue occurring during execution of faulty application 220B. As noted above, recovery system 236 may output recovery module 240 to the user computing device upon the user computing device initiating execution of faulty application 220B. However, recovery system 236 may output recovery module 240 in other ways, such as preemptively outputting recovery module 240 prior to the user computing device initiating execution of faulty application 220B (e.g., in order to reduce time required to download and execute recovery module 240). Recovery module 240 may address a number of different issues, such as a failure to execute faulty application 220B in a manner that enables user interaction with faulty application 220B (e.g., faulty application 220B may hang or crash).

Figure 3:
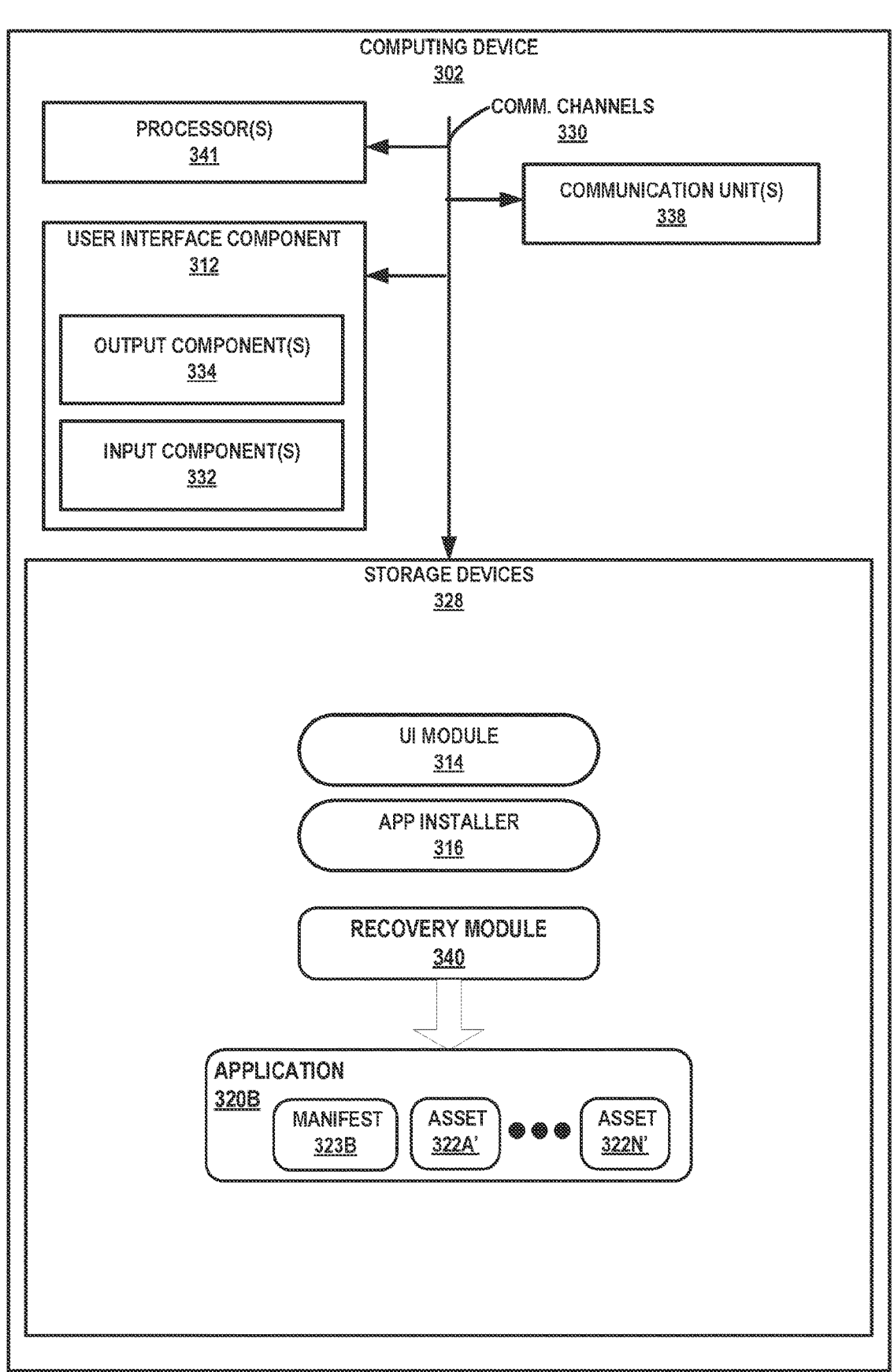
FIG. 3 is a block diagram illustrating an example computing device that is configured to apply recovery modules in accordance with various aspects of the recovery techniques described in this disclosure.

FIG. 3 is a block diagram illustrating an example computing device that is configured to apply recovery modules in accordance with various aspects of the recovery techniques described in this disclosure. FIG. 3 illustrates only one particular example of computing device 302, and many other examples of computing device 302 may be used in other instances and may include a subset of the components included in example computing device 302 or may include additional components not shown in FIG. 3. Computing device 302 may represent one example of computing device 102 shown in the example of FIG. 1.

As shown in the example of FIG. 3, computing device 302 includes user interface component (UIC) 312, one or more processors 341, one or more communication units 338, and one or more storage devices 328, each of which are interconnected by communication channels 330 (which may be similar to if not the same as communication channels 250 shown in the example of FIG. 2). UIC 312 may be similar to if not the same as UIC 112 shown in the example of FIG. 1. Processors 341 may be similar to if not the same as processors 241 shown in the example of FIG. 2. Communication units 338 may be similar to if not the same as communication units 242 shown in the example of FIG. 2. Storage devices 328 may be similar to if not the same as storage devices 248 shown in the example of FIG. 2.

As further shown in the example of FIG. 3, user interface component 312 may include one or more input components 332 and one or more output components 334. One or more input components 332 of computing device 302 may receive an input. Examples of inputs are tactile, audio, and video input. Input components 332, in one example, includes a presence-sensitive input device (e.g., a touch sensitive screen, a presence-sensitive display), mouse, keyboard, voice responsive system, video camera, microphone or any other type of device for detecting input from a human or machine. In some examples, input components 332 may include one or more sensor components such as one or more location sensors (GPS components. Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 334 of computing device 302 may generate output. Examples of output are tactile, audio, and video output. Output components 334 of computing device 302, in one example, includes a PSD, sound card, video graphics adapter card, speaker, cathode ray tube (CRT) monitor, liquid crystal display (LCD), or any other type of device for generating output to a human or machine.

While illustrated as an internal component of computing device 302, UIC 312 may also represent an external component that shares a data path with computing device 302 for transmitting and/or receiving input and output. For instance, in one example, UIC 312 represents a built-in component of computing device 302 located within and physically connected to the external packaging of computing device 302 (e.g., a display on a mobile phone). In another example, UIC 312 represents an external component of computing device 302 located outside and physically separated from the packaging or housing of computing device 302 (e.g., a monitor, a projector, etc. that shares a wired and/or wireless data path with computing device 302).

One or more storage devices 328 within computing device 302 may store information for processing during operation of computing device 302 (e.g., computing device 302 may store data accessed by a UI module 314, an application installer 316, a recovery module 340, and/or an application 320B during execution by computing device 302). Storage devices 328 may store program instructions and/or information (e.g., data) associated UI module 314, application installer 316 ("app installer 316"), recovery module 340, and/or application 320B. Storage components 328 may include a memory configured to store data or other information associated with UI module 314, app installer 316, recovery module 340, and/or application 320B.

As discussed above, app installer 316 may be executed by processors 341 to install application 320B at computing device 302. App installer 316 may perform the functions of an application marketplace application that allows users to interact with an application store via UIC 312 to browse, download, and install applications, such as application 320B. UIC 312 may receive an indication indicative of a request to download application 320B and user interface component 312 may forward the request to app installer 316. Responsive to the indication of the request to download application 320B, app installer 316 may then send the request to application provider server 204.

In response to sending the request for application 320B to application provider server 204, app installer 316 may receive application 320B and install application 320B within computing device 302. As time progresses app installer 316 may update or otherwise modify application 320B (e.g., updating assets 322A'-322N' of application 320B, which may be similar to assets 322' and/or assets 122' described above). Through updates or even upon initial install, application 320B may become faulty, presenting various issues that detract from the user experience. In some instances, application 320B may become faulty (and hence may be denoted as "faulty application 320B") to such extent that faulty application 320B may fail to execute in a manner that enables user interaction with faulty application 320B (e.g., faulty application 320B hangs with limited to no user interaction possible or crashes in which faulty application 320B unexpectedly quits execution).

Upon recognizing that application 320B is faulty (e.g., via manual or automatic reporting functions by way of app installer 316, bug reports, user feedback—such as application reviews for application 320B, etc.), the developer may generate and link recovery module 340 to application 320B as described above in more detail with respect to application provider server 104/204. Although described as being initiated by the developer, generation and linking of recovery module 340 may be initiated automatically (meaning, without developer oversight) in response to bug reports, crash reports, user reviews, etc.

User computing device 102 may, at some point after recovery module 340 is linked to application 320B, attempt to execute faulty application 320B. Upon initiating the execution of faulty application 320B, faulty application 320B may reference manifest 323B (having been updated to link recovery module 320 as the first sub-package to be executed) and determine that recovery module 340 is to be downloaded. Responsive to determining that recovery module 340 has been linked to faulty application 320B, app installer 316 interfaces with the recovery system 236 (FIG. 2) to retrieve (or, in this example, download via network 106; FIG. 1) recovery module 340. As such, application provider server 204 may output, to user computing device 302, recovery module 340, and user computing device 302 may receive, from application provider server 304, recovery module 340.

User computing device 302 may next execute recovery module 340 to resolve the issue occurring during execution of faulty application 320B by user computing device 302. Recovery module 340 may resolve the issue in a number of different ways depending on the issue identified by issue identification. Recovery module 340 may, for example, delete or edit a file installed by faulty application 320B, such as one of assets 322'. Recovery module 340 may, in some instances, delete or edit a cache associated with faulty application 320B (which may be stored to the partition for faulty application 320B in the application space discussed above). Recovery module 340 may, as yet a further example, edit or delete one or more entering in a database associated with faulty application 320B.

As noted above, application 320B may be installed as an experimental version of application 320 to test various new functionality (e.g., a beta test). Recovery module 340 may, in these instances, delete or edit an experimental parameter associated with faulty application 320B. In some examples, recovery module 340 may prompt the user to update faulty application 320B to a newer version, such as application 320N. As noted above, updates may require significantly more resources than recovery module 340, and app installer 316 may confirm that user computing device 302 includes sufficient resources (e.g., network connectivity, memory and/or storage space, etc.) prior to updating faulty application 320B.

FIGS. 4A-4E are diagrams illustrating example user interface for configuring, deploying, and monitoring recovery modules deployed for faulty application recovery in accordance with various aspects of the techniques described in this disclosure. Recovery system 236 of application provider server 204 (FIG. 2) may generate and present (via communication units 242) each of user interfaces (UIs) 400A-400E shown in the examples of FIGS. 4A-4E. UIs 400A-400E ("UIs 400") may represent example user interfaces with which a software developer of faulty application (e.g., faulty application 320B) may interact to specify faulty application information (e.g., FAI 137/237) in order to generate recovery module 140/240/340, deploy recovery module 140/240/340, and monitor deployment/adoption of recovery module 140/240/340.

Figure 4A:
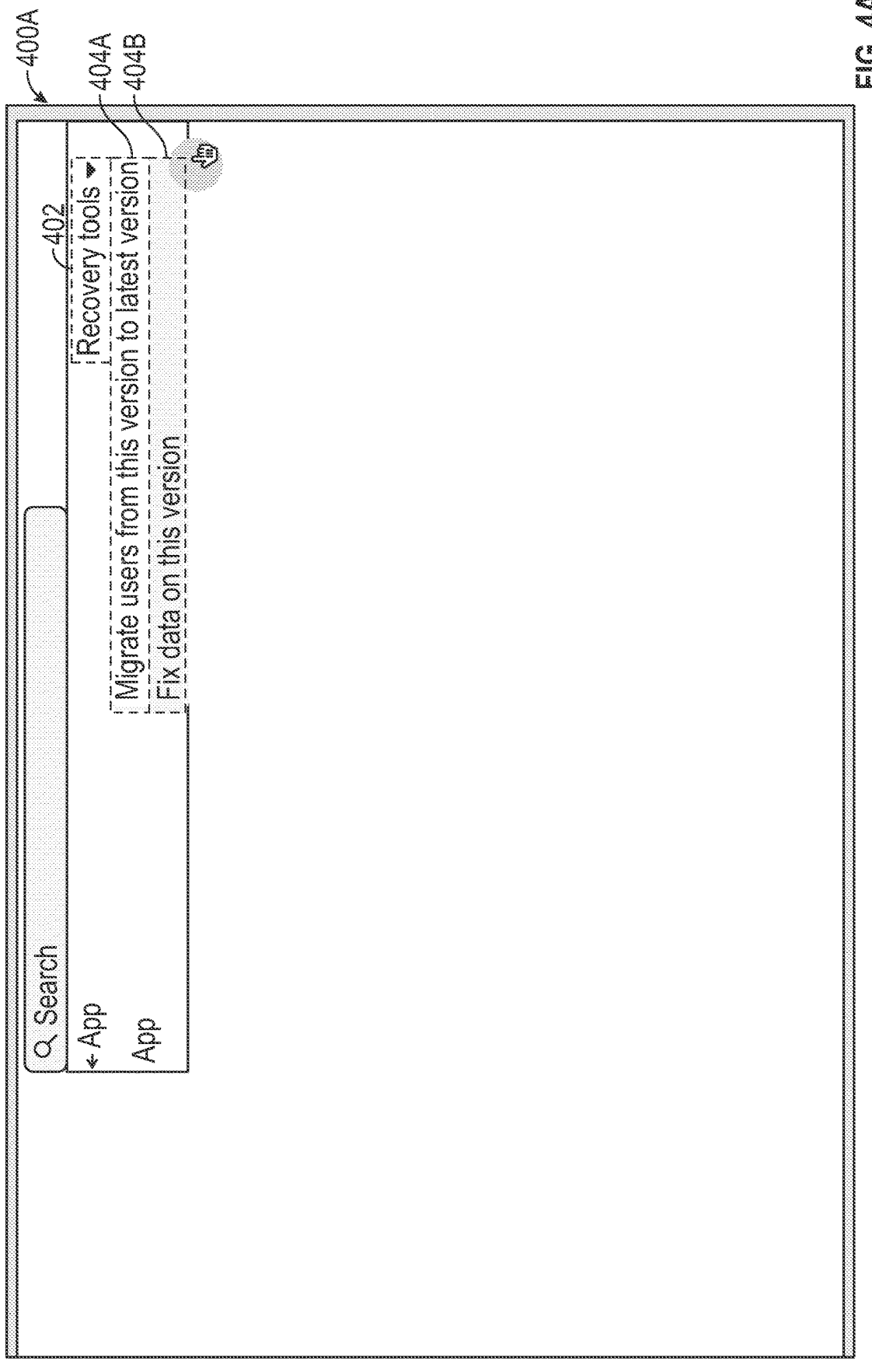
Figure 4B:
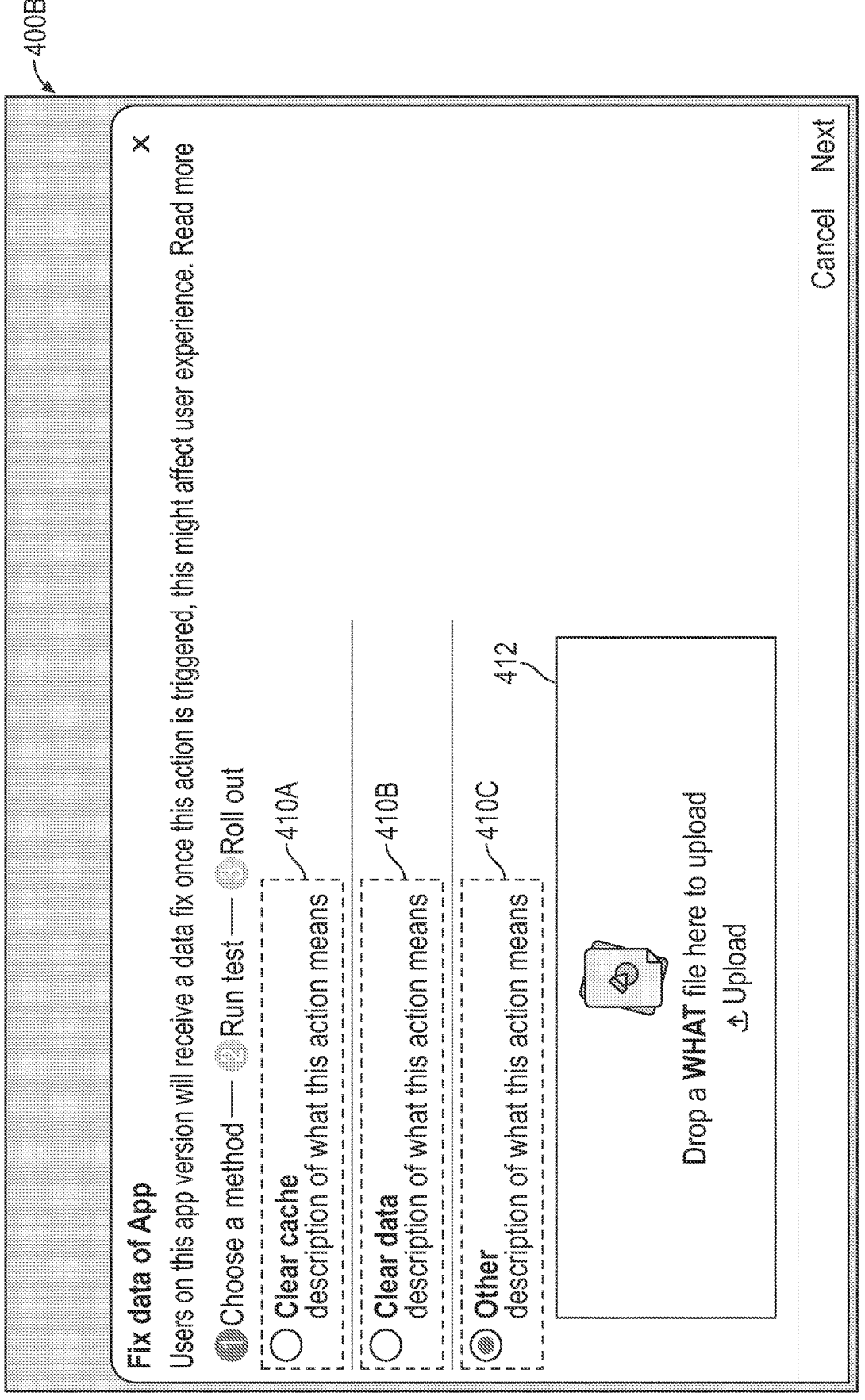
Figure 4C:
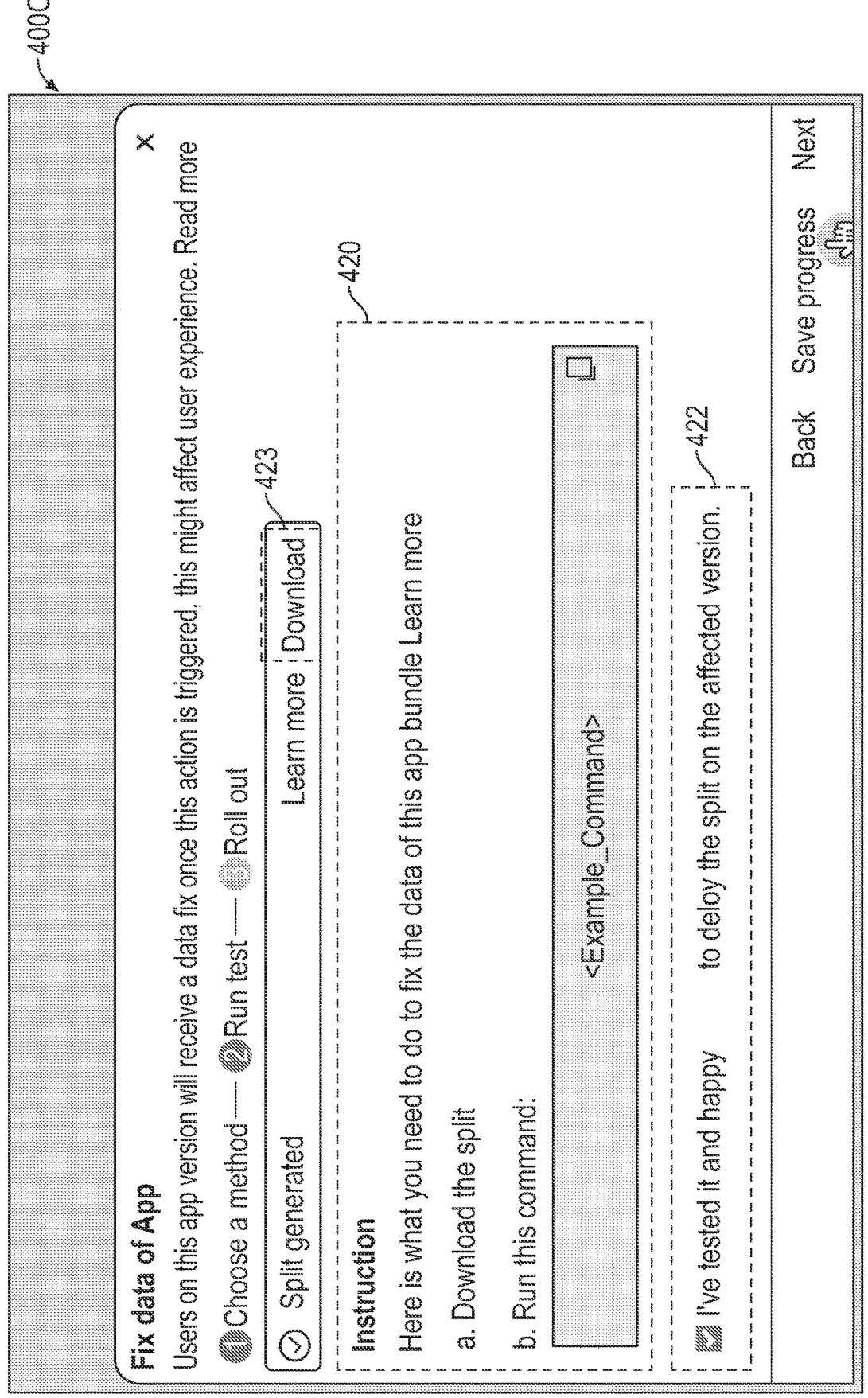
Figure 4D:
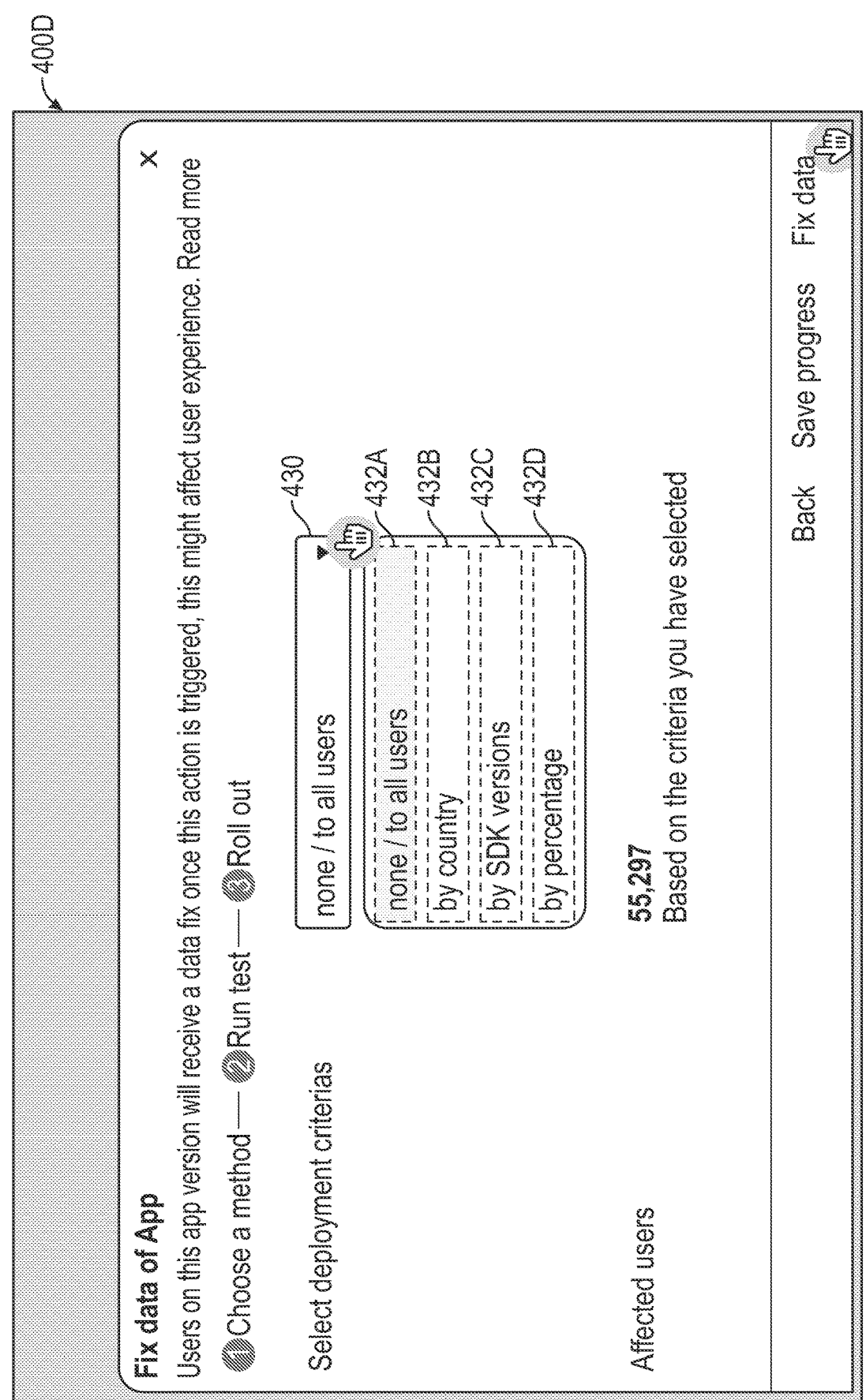

Referring first to the example of FIG. 4A, UI 400A may present an interface with which the developer may interact to view an application bundle, which is another way to refer to a bundle of different versions of an application, such as application 120/220/320. Further, UI 400A may identify various metrics, such as a download size for new installs, a time to download and install, a size for updates, and an install base (e.g., a number of installs across all compatible devices). The software developer may initiate the generation of the recovery module (or, in other words, the recovery process) by selecting a recovery tools dropdown box 402 and selecting different recovery options 404A and 404B.

Recovery option 404A may initiate generation of a recovery module 140/240/340 that updates an existing application to a latest version (which may involve application of a patch), and as such may "Migrate users from this version to latest version." Recovery option 404B may initiate generation of a recovery module 140/240/340 that edits or deletes various aspects of the data associated with faulty application 120B/220B/320B. Assuming the software developer, selection recovery option 404B (for purposes of illustration), UI 400A transitions to UI 400B shown in the example of FIG. 4B.

UI 400B may include a number of different option radio buttons 410A-410C that are associated with templates 139/239. Option radio button 410A may be associated with one of templates 139/239 for clearing a cache associated with faulty application 120B/220B/320B. Option radio button 410B may be associated with one of templates 139/239 for clearing data associated with faulty application 120B/220B/320B. Option radio button 410C may be associated with other data fixes defined via a file uploaded via upload frame 412. Once the software developer has selected one of option radio buttons 410A-410C. UI 400B transitions to UI 400C shown in the example of FIG. 4C.

UI 400C may present an information pane 420 instructing the software developer on how to test recovery module 140/240/340. That is, responsive to selecting one of templates 139/239 via option radio buttons 410A-410C, recovery system 136/236 may generate recovery module 140/240/340 as a split from faulty application 120B/220B/320B, where such split receives its own signature and signing keys separate from faulty application 120B/220B/320B (meaning this split may be separate and linked to faulty application 120B/220B/320B). This split may be considered to extend faulty application 120B/220B/320B without altering application 120B/220B/320B such that faulty application 120B/220B/320B may require a new signature.

In any event, the software developer may download recovery module 140/240/340 via download button 423 and run the command set forth in the instruction pane 420 to test recovery module 140/240/340. Assuming recovery module 140/240/340 is successful in resolving the issue with faulty application 120B/220B/320B, the software developer may confirm successful testing via test checkbox 422, prior to transitioning from UI 400C to UI 400D shown in the example of FIG. 4D.

UI 400D may include a deployment criteria dropdown box 430 that, when selected, is configured to present deployment criteria 432A-432D ("deployment criteria 432"). Deployment criteria 432 may represent different options for filtering deployment of recovery module 140/240/340, such as to none/to all users (deployment criteria 432A), by country (deployment criteria 432B), by software development kit (SDK) versions (deployment criteria 432C), and by percentage (deployment criteria 432D). While various example deployment criteria 432 are shown, it should be understood that more or less, including different, deployment criteria may be provided to facilitate limited, reduced, expanded or other types of deployment. Upon selecting one or more of deployment criteria 432, UI 400D may transition to UI 400E shown in the example of FIG. 4E.

UI 400E may present an overview of recovery module 140/240/340 in terms of deployment, e.g., method, targeting criteria, files and instructions, total affected users, and progress of 25% in terms of total affected users. The software developer may also edit recovery module 140/240/340 or cancel deployment of recovery module 140/240/340. UI 400E may also present a history of recovery modules over the life of application 120/220/320. In this respect, UIs 400 may enable configuring, deploying, and monitoring recovery module 140/240/340 deployed for recovery of faulty application 120B/220B/320B in accordance with various aspects of the techniques described in this disclosure.

FIG. 5 is a flowchart illustrating example operation of the application provider server shown in the example in FIG. 1 in generating the recovery module for application at the computing device in accordance with the recovery techniques described in this disclosure. Application provider server 104 may initially obtain a faulty application indication (FAI) 137 ("FAI 137") identifying faulty application 120B hosted for distribution by application provider server 104 (500). As noted above, faulty application 120B may have an issue occurring during execution of faulty application 120B by user computing device 102.

As shown in the example of FIG. 1, application provider server 104 may include a UI module 134 and a recovery system 136. UI module 134 may be similar to, and possibly the same as, UI module 114 in terms of operation to present a user interface, such as a graphical user interface. A developer of application 120 may interface with UI module 134 (typically via a remote computing system via a web browser or other application) to initiate a recovery process. Upon initiating a recover process via UI module 134, application provider server 104 may invoke recovery system 136.

Recovery system 136 may interface with UI module 134 to present various user interfaces with which the developer of application 120 may interact to specify FAI 137 (as discussed above with respect to the examples of FIGS. 4A-4E). The developer may specify FAI 137 by identifying a particular application (e.g., by name) and version (e.g., by number), which effectively selects one or more versions of application 120. FAI 137 may enable recovery module 140 to target one or more versions of application 120 that are faulty.

Recovery system 136 may further interface with the developer via user interfaces presented by UI module 134 to identify a type of the issue occurring during execution of faulty application 120B. In this respect, FAI 137 may include an issue indication that identifies the issue experienced during execution of faulty application 120B by user computing device 102. Recovery system 136 may next select, based on the issue indication, one of template code 139A-139N ("template code 139" or "templates 139") that targets the issue occurring during execution of faulty application 120B by user computing device 102. Recovery system 136 may next populate, based on the issue indication, the selected one of templates 139 to obtain populated template code configured to resolve the issue occurring during execution of faulty application 120B by user computing device 102.

Recovery system 136 may interface with UI module 134 to present, via the user interface, the populated template code. The developer may interface with the user interface to confirm or reject populated template code (or, in some instances, make changes to the populated template code). Assuming the developer approves of the populated template code, recovery system 136 may compile the populated template code to obtain recovery module 140. Recovery module 140 may extend faulty application 120B through an enhancement, which is linked to faulty application 120B through various mechanisms described in more detail above. In this respect, recovery system 136 may generate, based on FAI 137, dedicated recovery module 140 separate from and that extends faulty application 120B (502). In order to output recovery module 140, recovery system 136 may link recovery module 140 to faulty application 120B to enable recovery module 140 to be output to user computing device 102 in the manner described above (504). User computing device 102 may, at some point after recovery module 140 is linked to application 120B, attempt to initiate execution of faulty application 120B (506). Upon initiating the execution of faulty application 120B, faulty application 120B may interface with app installer 116 (which is a proxy for the application store) to identify linked updates (or, in other words, sub-packages) for faulty application 120B, including linked recovery module 140 (508). Responsive to determining that recovery module 140 has been linked to faulty application 120B, app installer 116 interfaces with recovery system 136 to retrieve (or, in this example, download via network 106) recovery module 140 (e.g., transmit a request for linked updates; 510). As such, application provider server 104 may receive the request for linked updates (512) and output, to user computing device 102, recovery module 140 (514).

User computing device 102 may receive, from application provider server 104, recovery module 140 (516). User computing device 102 may next execute recovery module 140 (518) to resolve the issue occurring during execution of faulty application 120B by user computing device 102. Recovery module 140 may resolve the issue in a number of different ways depending on the issue identified by issue identification and as described in more detail above.

Various aspects of the techniques may enable various examples set forth below with respect to the following clauses.

Clause 1. A method comprising: receiving, by one or more processors of a server computing device hosting distribution of a plurality of applications, a faulty application indication identifying a faulty application of the plurality of applications, the faulty application having an issue that occurs during execution of the faulty application by a user computing device; generating, by one or more processors of the server computing device and based on the faulty application indication, a dedicated recovery module that extends the faulty application; and outputting, by the one or more processors of the server computing device and to the user computing device, the dedicated recovery module to resolve the issue that occurs during execution of the faulty application.

Clause 2. The method of clause 1, wherein the faulty application indication identifies a name and a version associated with the faulty application, and wherein generating the dedicated recovery module comprises generating the dedicated recovery module to target the faulty application identified by the name and the version associated with the faulty application.

Clause 3. The method of any combination of clauses 1 and 2, wherein the dedicated recovery module is a separate application sub-package added to an application package used to install the faulty application, and wherein the separate application sub-package extends the application package used to install the faulty application.

Clause 4 The method of any combination of clauses 1-3, wherein generating the dedicated recovery module comprises separately compiling the dedicated recovery module from the faulty application.

Clause 5. The method of any combination of clauses 1-4, wherein the dedicated recovery module is configured to delete or edit a file installed by the faulty application.

Clause 6. The method of any combination of clauses 1-4, wherein the dedicated recovery module is configured to delete or edit a cache associated with the faulty application.

Clause 7 The method of any combination of clauses 1-4, wherein the dedicated recovery module is configured to delete or edit a database associated with the faulty application.

Clause 8. The method of any combination of clauses 1-4, wherein the dedicated recovery module is configured to delete or edit an experimental parameter associated with the faulty application.

Clause 9. The method of any combination of clauses 1-4, wherein the dedicated recovery module is configured to prompt an update to the faulty application.

Clause 10. The method of any combination of clauses 1-9, wherein receiving a faulty application indication comprises: presenting a user interface configured to prompt a developer of the faulty application to enter the faulty application indication; and receiving, via the user interface, the faulty application indication.

Clause 11. The method of any combination of clauses 1-10, wherein the faulty application indication includes an issue indication that identifies the issue experienced during execution of the faulty application by the user computing device, and wherein generating the dedicated recovery application comprises: selecting, based on the issue indication, template code that targets the issue occurring during execution of the faulty application by the user computing device; populating, based on the issue indication, the template code to obtain populated template code configured to resolve the issue occurring during execution of the faulty application by the user computing device; and compiling the populated template code to obtain the dedicated recovery module.

Clause 12. The method of any combination of clauses 1-11, wherein the issue occurring during execution of the faulty application by the user computing device includes a failure to execute the faulty application in a manner that enables user interaction with the faulty application.

Clause 13. A server computing device comprising: a memory configured to store a faulty application indication identifying a faulty application of a plurality of applications hosted for distribution by the server computing device, the faulty application having an issue occurring during execution of the faulty application by a user computing device; and one or more processors configured to: generate, based on the faulty application indication, a dedicated recovery module that extends the faulty application; and output, to the user computing device, the dedicated recovery module to resolve the issue occurring during execution of the faulty application.

Clause 14. The server of clause 13, wherein the faulty application indication identifies a name and a version associated with the faulty application, and wherein the one or more processors are, when configured to generate the dedicated recovery module, configured to generate the dedicated recover module to target the faulty application identified by the name and the version associated with the faulty application.

Clause 15. The server of any combination of clauses 13 and 14, wherein the dedicated recovery module is a separate application sub-package added to an application package used to install the faulty application, and wherein the separate application sub-package extends the application package used to install the faulty application.

Clause 16. The server of any combination of clauses 13-15, wherein the one or more processors are, when configured to generate the dedicated recovery module, configured to separately compile the dedicated recovery module from the faulty application.

Clause 17. The server of any combination of clauses 13-16, wherein the dedicated recovery module is configured to delete or edit a file installed by the faulty application.

Clause 18. The server of any combination of clauses 13-16, wherein the dedicated recovery module is configured to delete or edit a cache associated with the faulty application.

Clause 19. The server of any combination of clauses 13-16, wherein the dedicated recovery module is configured to perform one or more of delete or edit a database associated with the faulty application, and delete or edit an experimental parameter associated with the faulty application.

Clause 20. A non-transitory computer-readable storage medium having instructions stored thereon that, when executed, cause one or more processors of a server computing device to: receive a faulty application indication identifying a faulty application of a plurality of applications hosted for distribution by the server computing device, the faulty application having an issue occurring during execution of the faulty application by a user computing device; generate, based on the faulty application indication, a dedicated recovery module that extends the faulty application; and output, to the user computing device, the dedicated recovery module to resolve the issue occurring during execution of the faulty application.

Clause 1A. A method comprising: storing, by one or more processors of a user computing device, a faulty application that presents an issue during execution by the one or more processors; receiving, by one or more processors and from a server computing device that hosts distribution of a plurality of applications including the faulty application, a dedicated recovery module that extends the faulty application; and executing, by the one or more processors, the dedicated recovery module to resolve the issue occurring during execution of the faulty application.

Clause 2A. The method of clause 1A, further comprising executing the faulty application which invokes the execution of the dedicated recovery module to resolve the issue occurring during execution of the faulty application.

Clause 3A. The method of any combination of clauses 1A and 2A, wherein the dedicated recovery module is a separate application sub-package from an application package used to install the faulty application, and wherein the separate application sub-package extends the application package used to install the faulty application.

Clause 4A. The method of any combination of clauses 1A-3A, wherein the dedicated recovery module is separately compiled from the faulty application.

Clause 5A. The method of any combination of clauses 1A-4A, wherein executing the dedicated recovery module comprises executing the dedicated recovery module to delete or edit a file installed by the faulty application.

Clause 6A. The method of clause 5A, wherein executing the dedicated recovery module comprises executing the dedicated recovery module to delete or edit a cache associated with the faulty application.

Clause 7A. The method of clause 5A, wherein executing the dedicated recovery module comprises executing the dedicated recovery module to delete or edit a database associated with the faulty application.

Clause 8A. The method of clause 5A, wherein executing the dedicated recovery module comprises executing the dedicated recovery module to delete or edit an experimental parameter associated with the faulty application.

Clause 9A. The method of any combination of clauses 1A-4A, wherein executing the dedicated recovery module comprises executing the dedicated recovery module to prompt an update to the faulty application.

Clause 10A. The method of any combination of clauses 1A-9A, wherein the issue occurring during execution of the faulty application by the user computing device includes a failure to execute the faulty application in a manner that enables user interaction with the faulty application.

Clause 11A. A user computing device comprising: a memory configured to store a faulty application, the faulty application having an issue occurring during execution of the faulty application by the user computing device; and one or more processors configured to: receive, from a server computing device that hosts distribution of a plurality of applications including the faulty application, a dedicated recovery module that extends the faulty application; and execute, by the one or more processors, the dedicated recovery module to resolve the issue occurring during execution of the faulty application.

Clause 12A. The user computing device of clause 11A, wherein the one or more processors are further configured to execute the faulty application which invokes the execution of the dedicated recovery module to resolve the issue occurring during execution of the faulty application.

Clause 13A. The user computing device of any combination of clauses 11A and 12A, wherein the dedicated recovery module is a separate application sub-package from an application package used to install the faulty application, and wherein the separate application sub-package extends the application package used to install the faulty application.

Clause 14A. The user computing device of any combination of clauses 11A-13A, wherein the dedicated recovery module is separately compiled from the faulty application.

Clause 15A. The user computing device of any combination of clauses 11A-14A, wherein the one or more processors are, when configured to execute the dedicated recovery module, configured to execute the dedicated recovery module to delete or edit a file installed by the faulty application.

Clause 16A. The user computing device of clause 15A, wherein the one or more processors are, when configured to execute the dedicated recovery module, configured to execute the dedicated recovery module to delete or edit a cache associated with the faulty application.

Clause 17A. The user computing device of clause 15A, wherein the one or more processors are, when configured to execute the dedicated recovery module, configured to execute the dedicated recovery module to delete or edit a database associated with the faulty application.

Clause 18A. The user computing device of clause 15A, the one or more processors are, when configured to execute the dedicated recovery module, configured to execute the dedicated recovery module to delete or edit an experimental parameter associated with the faulty application.

Clause 19A. The user computing device of any combination of clauses 11A-14A, the one or more processors are, when configured to execute the dedicated recovery module, configured to execute the dedicated recovery module to prompt an update to the faulty application.

Clause 20A. A non-transitory computer-readable storage medium having instructions stored thereon that, when executed, cause one or more processors of a user computing device to: store a faulty application, the faulty application having an issue occurring during execution of the faulty application by the user computing device; receive, from a server computing device that hosts distribution of a plurality of applications including the faulty application, a dedicated recovery module that extends the faulty application; and execute, by the one or more processors, the dedicated recovery module to resolve the issue occurring during execution of the faulty application.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:

1. A method comprising:
receiving, by one or more processors of a server computing device hosting distribution of a plurality of applications, a faulty application indication identifying a faulty application of the plurality of applications, the faulty application having an issue that occurs during execution of the faulty application by a user computing device;
in response to receiving the faulty application indication, automatically generating, by one or more processors of the server computing device and based on the faulty application indication, a dedicated recovery module that extends functionality of the faulty application without modifying existing code of the faulty application, wherein generating the dedicated recovery module comprises:
selecting, based on the faulty application indication, a template code that targets the issue that occurs during execution of the faulty application by a user computer computing device;
populating the selected template code to obtain populated template code configured to resolve the issue; and
compiling the populated template code to generate the dedicated recovery module, wherein the dedicated recovery module is a sub-package separate from the faulty application, is generated to target the faulty application, and compiles separately from the faulty application;
linking the dedicated recovery module to the faulty application by at least modifying, by the one or more processors, a manifest file associated with the faulty application with instructions to add the dedicated recovery module as a sub-package, wherein the manifest file lists a plurality of sub-packages associated with the faulty application and causes the dedicated recovery module to be executed before any other sub-package in the plurality sub-packages associated with the faulty application; and
sending, by the one or more processors and to the user computing device, the manifest file, wherein the manifest file is configured to cause the user computing device, upon initiation of execution of the faulty application, to:
determine that the dedicated recovery module has been linked to the faulty application and is to be executed first before any other sub-packages associated with the faulty application based on the manifest file;
retrieve the dedicated recovery module; and
execute the dedicated recovery module to resolve the issue that occurs during execution of the faulty application.

2. The method of claim 1,
wherein the faulty application indication identifies a name and a version associated with the faulty application, and wherein generating the dedicated recovery module comprises generating the dedicated recovery module to target the faulty application identified by the name and the version associated with the faulty application.

3. The method of claim 1, wherein the dedicated recovery module is configured to delete or edit a file installed by the faulty application.

4. The method of claim 1, wherein the dedicated recovery module is configured to delete or edit a cache associated with the faulty application.

5. The method of claim 1, wherein the dedicated recovery module is configured to delete or edit a database associated with the faulty application.

6. The method of claim 1, wherein the dedicated recovery module is configured to delete or edit an experimental parameter associated with the faulty application.

7. The method of claim 1, wherein the dedicated recovery module is configured to prompt an update to the faulty application.

8. The method of claim 1, wherein receiving a faulty application indication comprises:

presenting a user interface configured to prompt a developer of the faulty application to enter the faulty application indication; and receiving, via the user interface, the faulty application indication.

9. The method of claim 1, wherein the faulty application indication includes an issue indication that identifies the issue experienced during execution of the faulty application by the user computing device.

10. The method of claim 1, wherein the issue occurring during execution of the faulty application by the user computing device includes a failure to execute the faulty application in a manner that enables user interaction with the faulty application.

11. A server computing device comprising:

a memory configured to store a faulty application indication identifying a faulty application of a plurality of applications hosted for distribution by the server computing device, the faulty application having an issue occurring during execution of the faulty application by a user computing device; and one or more processors configured to:

in response to receiving the faulty application indication, automatically generate, based on the faulty application indication, a dedicated recovery module that extends functionality of the faulty application without modifying existing code of the faulty application, wherein the dedicated recovery module is a sub-package separate from the faulty application, is generated to target the faulty application, and compiles separately from the faulty application wherein, to generate the dedicated recovery module, the one or more processors are configured to:

select, based on the faulty application indication, a template code that targets the issue that occurs during execution of the faulty application by a user computer computing device;

populate the selected template code to obtain populated template code configured to resolve the issue; and compile the populated template code to generate the dedicated recovery module link the dedicated recovery module to the faulty application by at least modifying a manifest file associated with the faulty application with instructions to add the dedicated recovery module as a sub-package, wherein the manifest file causes the dedicated recovery module to be executed before any other sub-package associated with the faulty application; and send to the user computing device, the manifest file, wherein the manifest file is configured to cause the user computing device, upon initiation of execution of the faulty application, to:

determine that the dedicated recovery module has been linked to the faulty application and is to be executed first before any other sub-packages associated with the faulty application based on the manifest file;

retrieve the dedicated recovery module; and execute the dedicated recovery module to resolve the issue occurring during execution of the faulty application.

12. The server computing device of claim 11, wherein the faulty application indication identifies a name and a version associated with the faulty application, and wherein the one or more processors are, when configured to generate the dedicated recovery module, configured to generate the dedicated recovery module to target the faulty application identified by the name and the version associated with the faulty application.

13. The server computing device of claim 11, wherein the dedicated recovery module is configured to delete or edit a file installed by the faulty application.

14. The server computing device of claim 11, wherein the dedicated recovery module is configured to delete or edit a cache associated with the faulty application.

15. The server computing device of claim 11, wherein the dedicated recovery module is configured to perform one or more of delete or edit a database associated with the faulty application, and delete or edit an experimental parameter associated with the faulty application.

16. A non-transitory computer-readable storage medium having instructions stored thereon that, when executed, cause one or more processors of a server computing device to:

receive a faulty application indication identifying a faulty application of a plurality of applications hosted for distribution by the server computing device, the faulty application having an issue occurring during execution of the faulty application by a user computing device;

in response to receiving the faulty application indication, automatically generate, based on the faulty application indication, a dedicated recovery module that extends functionality of the faulty application without modifying existing code of the faulty application, wherein the dedicated recovery module is a sub-package separate from the faulty application, is generated to target the faulty application, and compiles separately from the faulty application, wherein, to generate the dedicated recovery module, the one or more processors are configured to:

select, based on the faulty application indication, a template code that targets the issue that occurs during execution of the faulty application by a user computer computing device;

populate the selected template code to obtain populated template code configured to resolve the issue; and compile the populated template code to generate the dedicated recovery module;

link the dedicated recovery module to the faulty application by at least modifying a manifest file associated with the faulty application with instructions to add the dedicated recovery module as a sub-package, wherein the manifest file causes the dedicated recovery module to be executed before any other sub-package associated with the faulty application; and send to the user computing device, the manifest file, wherein the manifest file is configured to cause the user computing device, upon initiation of execution of the faulty application, to:

determine that the dedicated recovery module has been linked to the faulty application and is to be executed first before any other sub-packages associated with the faulty application based on the manifest file;

retrieve the dedicated recovery module; and execute the dedicated recovery module to resolve the issue occurring during execution of the faulty application.

\* \* \* \* \*